US012668029B2

(12) United States Patent (10) Patent No.: US 12,668,029 B2
Diamanti et al. (45) Date of Patent: Jun. 30, 2026

(54) DEVICE FOR WELDING PLASTIC TUBES

(71) Applicant: GenesisBPS, Ramsey, NJ (US)

(72) Inventors: Jacob M. Diamanti, Burlington Township, NJ (US); Jerrold B. Grossman, Boca Raton, FL (US)

(73) Assignee: Genesis BPS, LLC, Ramsey, NJ (US)

( * ) Notice: Subject to any disclaimer, the term of this patent is extended or adjusted under 35 U.S.C. 154(b) by 880 days.

(21) Appl. No.: 18/074,161

(22) Filed: Dec. 2, 2022

(65) Prior Publication Data

US 2023/0094847 A1     Mar. 30, 2023

Related U.S. Application Data

(63) Continuation of application No. 17/707,302, filed on Mar. 29, 2022.

(60) Provisional application No. 63/168,590, filed on Mar. 31, 2021.

(51) Int. Cl.
  *B29C 65/22*       (2006.01)
  *B29C 65/78*       (2006.01)
  *B29L 23/00*        (2006.01)

(52) U.S. Cl.
  CPC ........ *B29C 65/222* (2013.01); *B29C 65/7841* (2013.01); *B29L 2023/22* (2013.01)

(58) Field of Classification Search
  CPC .............. B29C 65/222; B29C 65/7841; B29C 66/1142; B29C 66/857; B29C 66/0018; B29C 65/18; B29C 65/7802; B29C 66/91231; B29C 66/8322; B29L 2023/22
  See application file for complete search history.

(56) References Cited

U.S. PATENT DOCUMENTS

| | | | |
|---|---|---|---|
| 2,908,795 | A | 10/1959 | Branstrom |
| 3,954,541 | A | 5/1976 | Landgraf |
| 4,753,697 | A | 6/1988 | Shaposka et al. |
| 4,770,735 | A | 9/1988 | Shaposka et al. |
| 4,793,880 | A | 12/1988 | Shaposka et al. |
| 4,832,773 | A | 5/1989 | Shaposka et al. |
| 4,864,101 | A | 9/1989 | Shaposka et al. |

(Continued)

FOREIGN PATENT DOCUMENTS

| | | |
|---|---|---|
| DE | 845564 C | 8/1952 |
| FR | 2856004 | 12/2004 |

(Continued)

OTHER PUBLICATIONS

Supplementary European Search Report in European Patent Application No. 22782012.3, dated Jan. 16, 2025, 10 Pages.

(Continued)

*Primary Examiner* — Vishal I Patel
(74) *Attorney, Agent, or Firm* — Andrus Intellectual Property Law, LLP

(57)                    ABSTRACT

A tube welder including a clamp block configured to receive a tube, a carriage movable along a first axis, and a slide rail coupling the clamp block to the carriage such that the clamp block is configured to move along a second axis between the carriage and the clamp block. The tube welder further including a spring biasing the clamp block in a first direction along the second axis and a linkage configured to move the clamp block in the first direction and in a second direction along the second axis, opposite the first direction.

20 Claims, 23 Drawing Sheets

(56) References Cited

U.S. PATENT DOCUMENTS

| | | | |
|---|---|---|---|
| 4,897,138 | A | 1/1990 | Shaposka et al. |
| 4,913,756 | A | 4/1990 | Shaposka et al. |
| 4,933,036 | A | 6/1990 | Shaposka et al. |
| 5,141,592 | A | 8/1992 | Shaposka et al. |
| 5,156,701 | A | 10/1992 | Spencer et al. |
| 5,158,630 | A | 10/1992 | Shaposka et al. |
| 5,209,800 | A | 5/1993 | Spencer et al. |
| 5,244,522 | A | 9/1993 | Spencer et al. |
| 5,248,359 | A | 9/1993 | Shaposka et al. |
| 5,256,229 | A | 10/1993 | Spencer |
| 5,279,685 | A | 1/1994 | Ivansons et al. |
| D355,848 | S | 2/1995 | Ivansons et al. |
| 5,397,425 | A | 3/1995 | Ivansons et al. |
| D357,926 | S | 5/1995 | Ivansons et al. |
| 5,525,186 | A | 6/1996 | Ivansons et al. |
| 5,632,852 | A | 5/1997 | Ivansons et al. |
| 5,674,333 | A | 10/1997 | Spencer |
| 5,855,731 | A | 1/1999 | Spencer |
| 5,871,612 | A | 2/1999 | Spencer |
| 6,020,574 | A | 2/2000 | Ivansons |
| 6,132,833 | A | 10/2000 | Spencer |
| 6,177,652 | B1 | 1/2001 | Ivansons |
| 6,406,063 | B1 | 6/2002 | Pfeiffer |
| 6,637,489 | B1 | 10/2003 | Spencer |
| 7,371,305 | B2 | 5/2008 | Sano et al. |
| 7,398,813 | B1 | 7/2008 | Ivansons et al. |
| 7,657,996 | B2 | 2/2010 | Sano et al. |
| 7,779,880 | B2 * | 8/2010 | Sano ................... B29C 66/5221 156/518 |
| 8,066,269 | B2 | 11/2011 | Ivansons et al. |
| 8,396,355 | B2 | 3/2013 | Jones |
| 8,708,019 | B2 | 4/2014 | Ivansons et al. |
| 9,199,070 | B2 | 12/2015 | Wegener et al. |
| 9,440,396 | B2 | 9/2016 | Kusters et al. |
| 9,550,588 | B2 | 1/2017 | Mueller et al. |
| 10,183,447 | B2 | 1/2019 | Chengalvarayan et al. |
| 10,307,582 | B2 | 6/2019 | Wegener et al. |
| 10,919,235 | B2 | 2/2021 | Kusters et al. |
| 11,325,321 | B2 | 5/2022 | Kusters et al. |
| 2006/0005371 | A1 | 1/2006 | Sano et al. |
| 2007/0256791 | A1 | 11/2007 | Augustine et al. |
| 2008/0023135 | A1 | 1/2008 | Ivansons et al. |
| 2012/0080418 | A1 | 4/2012 | Sakamoto et al. |
| 2018/0345589 | A1 * | 12/2018 | Bühler ............... B29C 65/2046 |

FOREIGN PATENT DOCUMENTS

| | | |
|---|---|---|
| JP | S61225030 A | 10/1986 |
| WO | WO 2014/128972 | 8/2014 |
| WO | WO-2018173957 A1 * | 9/2018 ......... B29C 66/0018 |

OTHER PUBLICATIONS

International Search Report & Written Opinion, International Patent Application No. PCT/US2022/022315, dated Aug. 15, 2022, 12 pages.

* cited by examiner

DEVICE FOR WELDING PLASTIC TUBES

CROSS REFERENCE TO RELATED APPLICATIONS

The present application is a continuation of U.S. patent application Ser. No. 17/707,302, filed Mar. 29, 2022, which claims the priority benefit of U.S. Provisional Patent Application No. 63/168,590, filed Mar. 31, 2021, which are incorporated herein by reference in their entireties.

TECHNICAL FIELD

The present disclosure relates to a welding device, and more particularly to an apparatus for welding sterile plastic tubing.

BACKGROUND

Conventional plastic tube welders clamp, strip, cut, heat, and weld two plastic tubes together. For example, there are medical or scientific procedures that require sterile transfer of dangerous or sensitive fluids from one container to another (e.g., continuous ambulatory peritoneal dialysis (CAPD)). One example of a conventional plastic tube welder is disclosed in U.S. Pat. No. 7,398,813 and is incorporated by reference herein.

Conventional devices used for welding plastic tubes have disadvantages that include having low reliability when deployed in the field for use, poor quality of resulting welds, inefficiencies, and lack of automation.

SUMMARY

The disclosure provides, in one aspect, a heater assembly including a core with a longitudinal axis, a winding positioned around the core, a first reflector including a first surface, and a second reflector including a second surface. The core is positioned between the first surface of first reflector and the second surface of the second reflector.

In some embodiments, the first surface is arcuate and the second surface is arcuate.

In some embodiments, the first surface includes a first planar portion, a first side portion, and a second side portion, and wherein the first planar portion is between the first side portion and the second side portion.

In some embodiments, the first side portion has a first thickness and the first planar portion has a second thickness, wherein the first thickness is larger than the second thickness.

In some embodiments, the second surface includes a second planar portion, a third side portion, and a fourth side portion, wherein the second planar portion is between the third side portion and the fourth side portion.

In some embodiments, a first gap is formed between the first side portion and the third side portion, and a second gap is formed between the second side portion and the fourth side portion.

In some embodiments, the core is positioned between the first gap and the second gap.

In some embodiments, the first gap is configured to receive a portion of a first tube and the second gap is configured to receive a portion of a second tube.

In some embodiments, the first planar portion is parallel to the second planar portion, wherein the first side portion and the third side portion are parallel, and wherein the second side portion and the fourth side portion are parallel.

In some embodiments, the first reflector includes a first side portion and a second side portion, and wherein the first side portion and the second side portion wrap partially around the core.

In some embodiments, the first reflector includes a mount configured to at least partially receive the core.

In some embodiments, the second reflector includes a bore in which to receive a fastener, and wherein the core is retrained within the mount by the fastener.

In some embodiments, the mount is a V-shaped groove.

In some embodiments, the mount and the fastener establish three points of contact with the core.

In some embodiments, the core is cylindrical.

In some embodiments, the core is alumina ceramic and the winding is nichrome.

In some embodiments, the first reflector and the second reflector are stainless steel.

In some embodiments, a first gap is formed between the first reflector and the second reflector, and a second gap is formed between the first reflector and the second reflector.

In some embodiments, the core is positioned between the first gap and the second gap.

In some embodiments, the first gap is configured to receive a portion of a first tube and the second gap is configured to receive a portion of a second tube.

The disclosure provides, in one aspect, a tube welder including a clamp block configured to receive a tube and a screw coupled to the clamp block. The clamp block translates along the screw in response to rotation of the screw. The tube welder further includes a finger slidably coupled to the clamp block, a spring biasing the finger to an extended position, and a carriage with a notch. The carriage is coupled to the clamp block by a slide rail to permit relative movement between the carriage and the clamp block. When the finger is in the extended position, at least a portion of the finger is received within the notch and the clamp block is fixed for co-translation with respect to the carriage.

In some embodiments, the clamp block is a first clamp block and the tube welder further includes a second clamp block coupled to the carriage, the second clamp block configured to receive the tube.

In some embodiments, the tube welder includes a rail positioned between the first clamp block and the second clamp block.

In some embodiments, the rail includes a first surface facing the first clamp block and a second surface facing the second clamp block; wherein the first surface is planar and the second surface is non-planar.

In some embodiments, a distance between the second clamp block and a center axis of the rail varies as the second clamp block translates along the center axis.

In some embodiments, the finger includes a post that is slidably received within a slot.

In some embodiments, in response to the clamp block translating with respect to the screw, the post translates within the slot.

In some embodiments, the slot translates the post against the spring bias such that the finger is in a retracted position, and wherein the clamp block is free to translate with respect to the carriage.

In some embodiments, the carriage includes a groove configured to receive a portion of the clamp block.

In some embodiments, the notch is formed within the groove on the carriage.

In some embodiments, the slot includes a first portion, a second portion, a third portion, and a fourth portion, and wherein the second portion is positioned between the first portion and the third portion, and wherein the third portion is positioned between the second portion and the fourth portion.

In some embodiments, the slot further includes a first ramp positioned between the first portion and the second portion.

In some embodiments, a second ramp is positioned between the second portion and the third portion.

In some embodiments, a third ramp is positioned between the third portion and the fourth portion.

In some embodiments, the second portion is positioned further away from the carriage than the first portion and the third portion.

In some embodiments, the fourth portion is positioned further away from the carriage than the first portion and the third portion.

In some embodiments, the notch is a first notch and the carriage further includes a second notch, and wherein the portion of the finger is received in either the first notch or the second notch when in the extended position and the clamp block is thereby coupled for co-translation with the carriage.

In some embodiments, the tube welder further includes a detent configured to stop translation of the carriage until a threshold force is reached.

In some embodiments, the detent includes a ball plunger coupled to the carriage and a rail along which the ball plunger slides.

In some embodiments, the rail includes a protrusion against which the ball plunger abuts such that the detent stops translation of the carriage until the threshold force is reached.

The disclosure provides, in one aspect, a tube welder including a clamp block configured to receive a tube, a carriage movable along a first axis, and a slide rail coupling the clamp block to the carriage such that the clamp block is configured to move along a second axis between the carriage and the clamp block. The tube welder further including a spring biasing the clamp block in a first direction along the second axis and a linkage configured to move the clamp block in the first direction and in a second direction along the second axis, opposite the first direction.

In some embodiments, the linkage includes a first protrusion and a second protrusion; and the clamp block includes a post configured to be at least partially received between the first protrusion and the second protrusion.

In some embodiments, the clamp block translates in the first direction along the second axis when the first protrusion abuts the post.

In some embodiments, the clamp block translates in the second direction along the second axis when the second protrusion abuts the post.

In some embodiments, the second axis is orthogonal to the first axis.

In some embodiments, the linkage includes: a motor; a transmission coupled to the motor; a first bar member coupled to the transmission; and a second bar member coupled to the first bar member at a pivot.

In some embodiments, the second bar member includes a protrusion, wherein the protrusion is configured to engage the clamp block.

In some embodiments, the tube welder further includes a sensor configured to detect the position of the linkage.

In some embodiments, the sensor detects the position of the second bar member.

In some embodiments, the sensor detects the position of the transmission.

In some embodiments, the transmission transfers rotational motion from the motor to linear translation of the first bar member.

In some embodiments, the tube welder further includes a release assembly coupled to the linkage, wherein the release assembly moves in response to a force acting on the linkage exceeding a threshold force.

In some embodiments, the release assembly includes a carrier coupled to the linkage and a spring biasing the carrier.

In some embodiments, the tube welder further includes a rail positioned with a non-planar surface facing the clamp block.

In some embodiments, the rail extends along a center axis that is parallel to the first axis.

In some embodiments, a distance between the clamp block and the center axis of the rail varies as the clamp block translates along the first axis.

In some embodiments, a heating assembly is coupled to the rail.

In some embodiments, the heating assembly includes a core with a longitudinal axis, a winding positioned around the core, a first reflector including a first surface; and a second reflector including a second surface.

In some embodiments, the core is positioned between the first surface of first reflector and the second surface of the second reflector.

In some embodiments, the clamp block is a first clamp block and the tube welder further includes a second clamp block coupled to the carriage by a slide rail to permit relative movement between the carriage and the second clamp block.

Other aspects of the disclosure will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practices or of being carried out in various ways.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
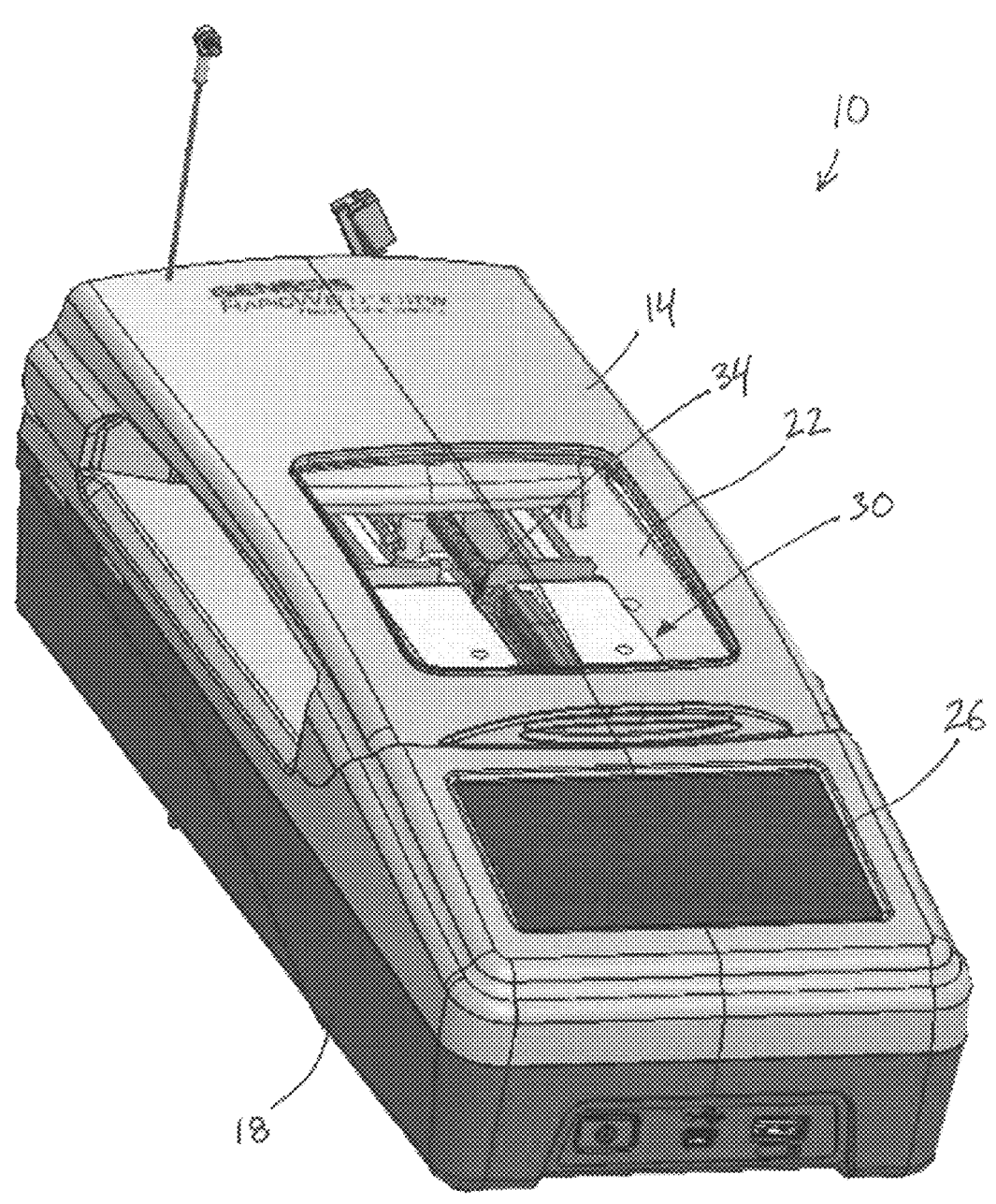
FIG. 1 is a perspective view of a welding device with a top cover in a closed position.
Figure 2:
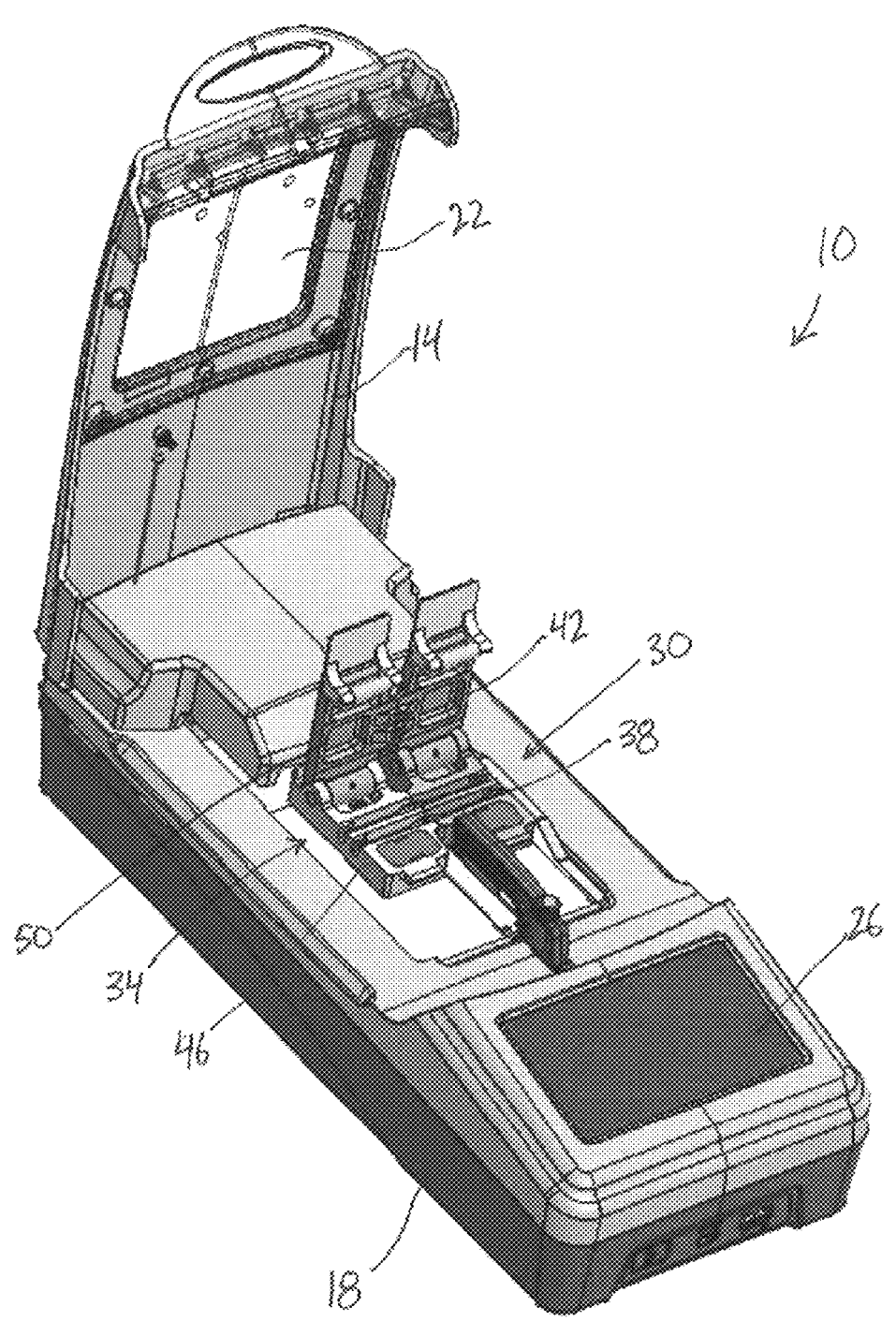
FIG. 2 is a perspective view of the welding device of FIG. 1 in a load configuration, with the top cover in an open position and tube clamps in an open position.

With reference to FIG. 1, a welding device 10 (i.e., a tube welder) is configured to weld plastic tubes. The welding device 10 includes a cover 14 that pivots with respect to a base 18 between a closed position (FIG. 1) and an open position (FIG. 2). In the illustrated embodiment, the cover 14 includes a transparent window 22. The welding device 10 further includes a display 26, which in some embodiments is a touch-sensitive user interface display.

With reference to FIG. 2, the welding device 10 includes a first tube clamp 30 and a second tube clamp 34. The first tube clamp 30 includes a first clamp block 38 and a first clamp cover 42 pivotably coupled to the first clamp block 38. The second tube clamp 34 includes a second clamp block 46 and a second clamp cover 50 pivotably coupled to the second clamp block 46. The first tube clamp 30 an the second stube clamp 34 are shown in an open position in FIG. 2 and are configured to receive tubing.

Figure 3:
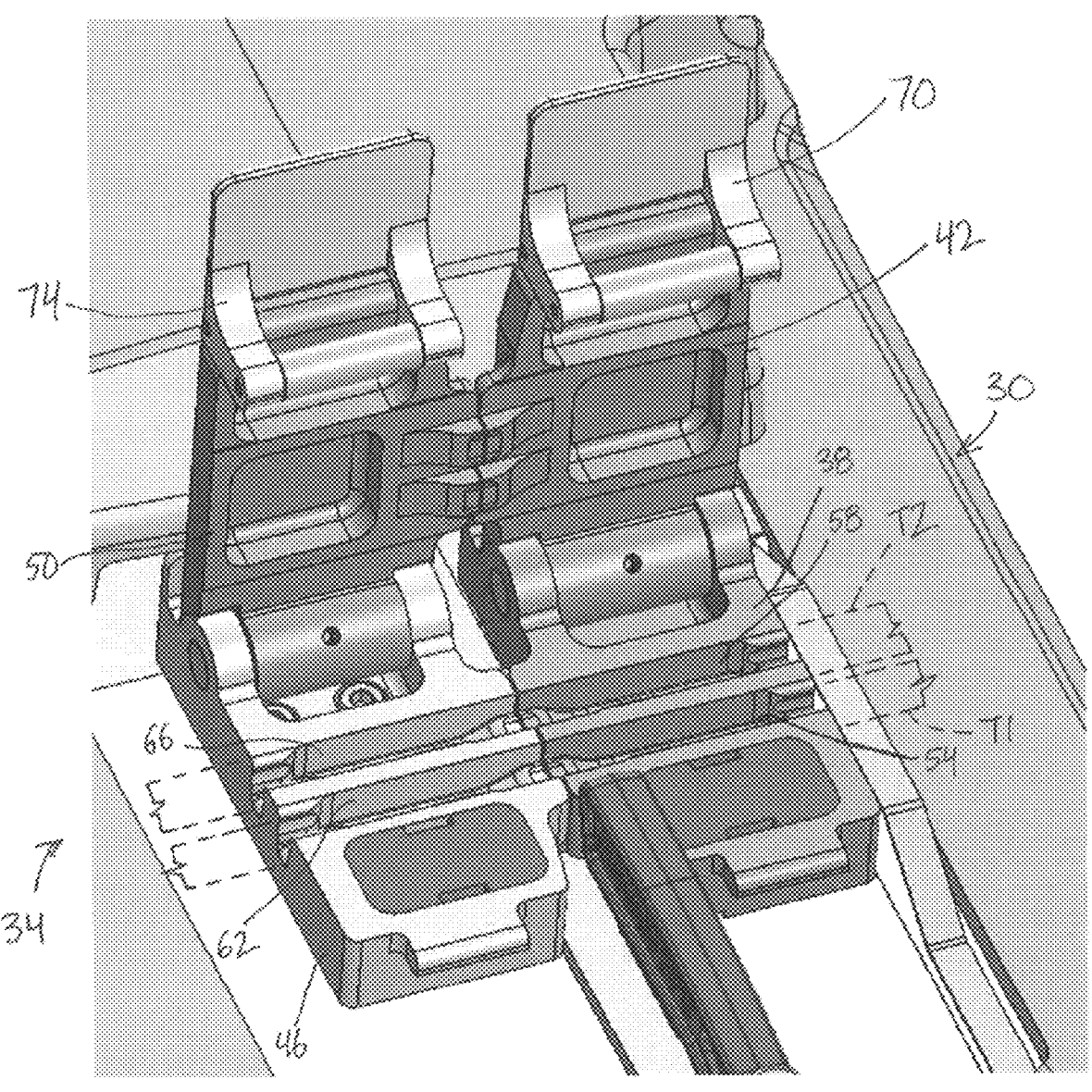
FIG. 3 is a partial perspective view of the tube clamps of the welding device of FIG. 2 in the load configuration.

With reference to FIG. 3, the first block 38 includes a first groove 54 and a second groove 58 configured to receive plastic tube. Likewise, the second block 46 includes a third groove 62 and a fourth groove 66 configured to receive plastic tube. In the load configuration of FIG. 3 (i.e., when the plastic tubing is loaded into the welding device), the first groove 54 is aligned with the third groove 62 and a first tube T1 is positioned in the first groove 54 and the third groove 62. Likewise, the second groove 58 is aligned with the fourth groove 66 in the load configuration of FIG. 3, and a second tube T2 is positioned in the second groove 58 and the fourth groove 66. Once the first and second tubes T1, T2 are positioned within the clamp blocks 38, 46, the covers 42, 50, respectively, are pivoted closed to secure the tubes T1, T2 within the clamps 30, 34. The first cover 42 is securable to the first block 38 in a closed position by a first user-actuated latch 70, and the second cover 50 is securable to the second block 46 in a closed position by a second user-actuated latch 74.

Figure 15:
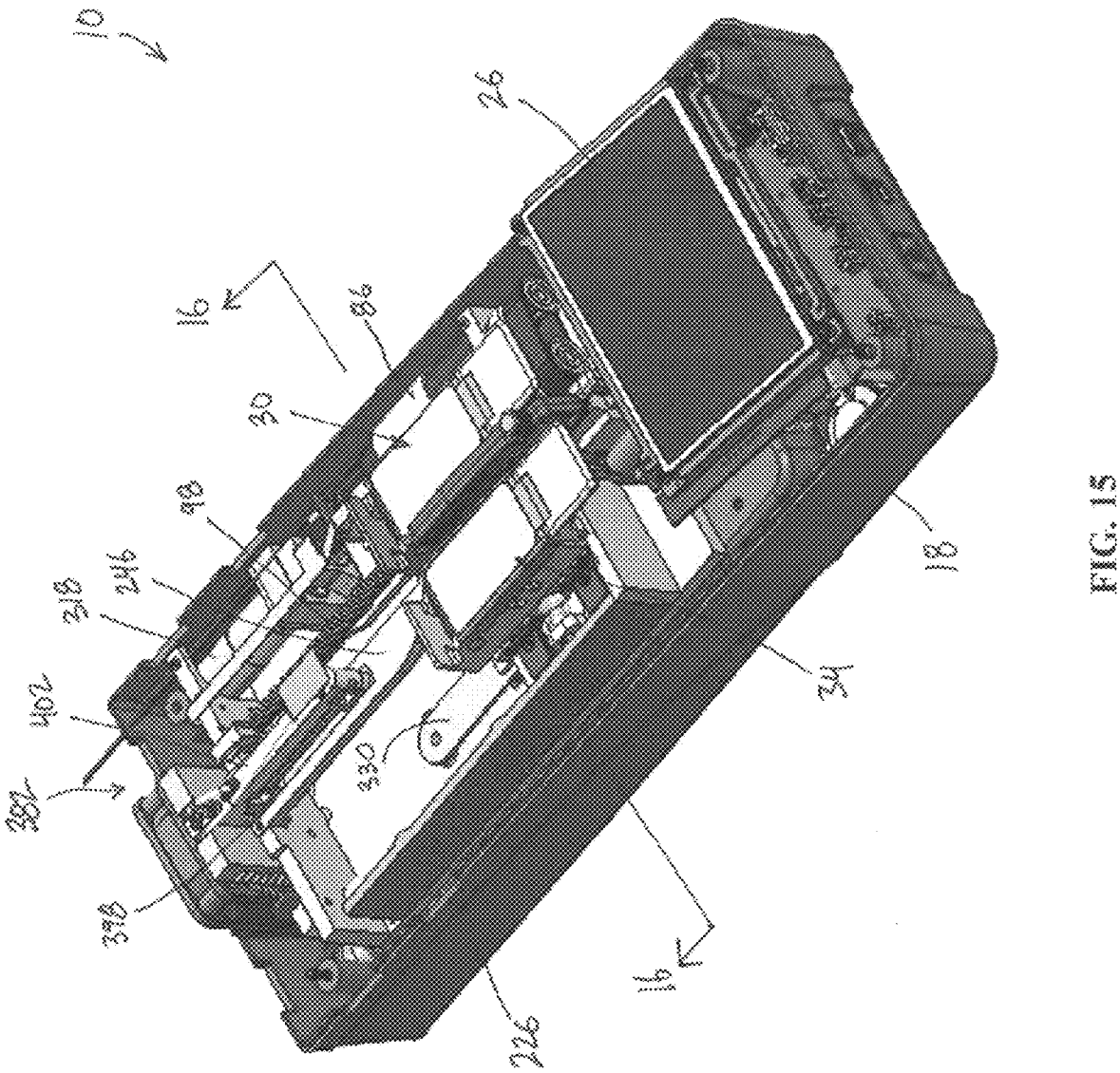
FIG. 15 is a perspective view of the welding device of FIG. 1, illustrated in a cut configuration.
Figure 16:
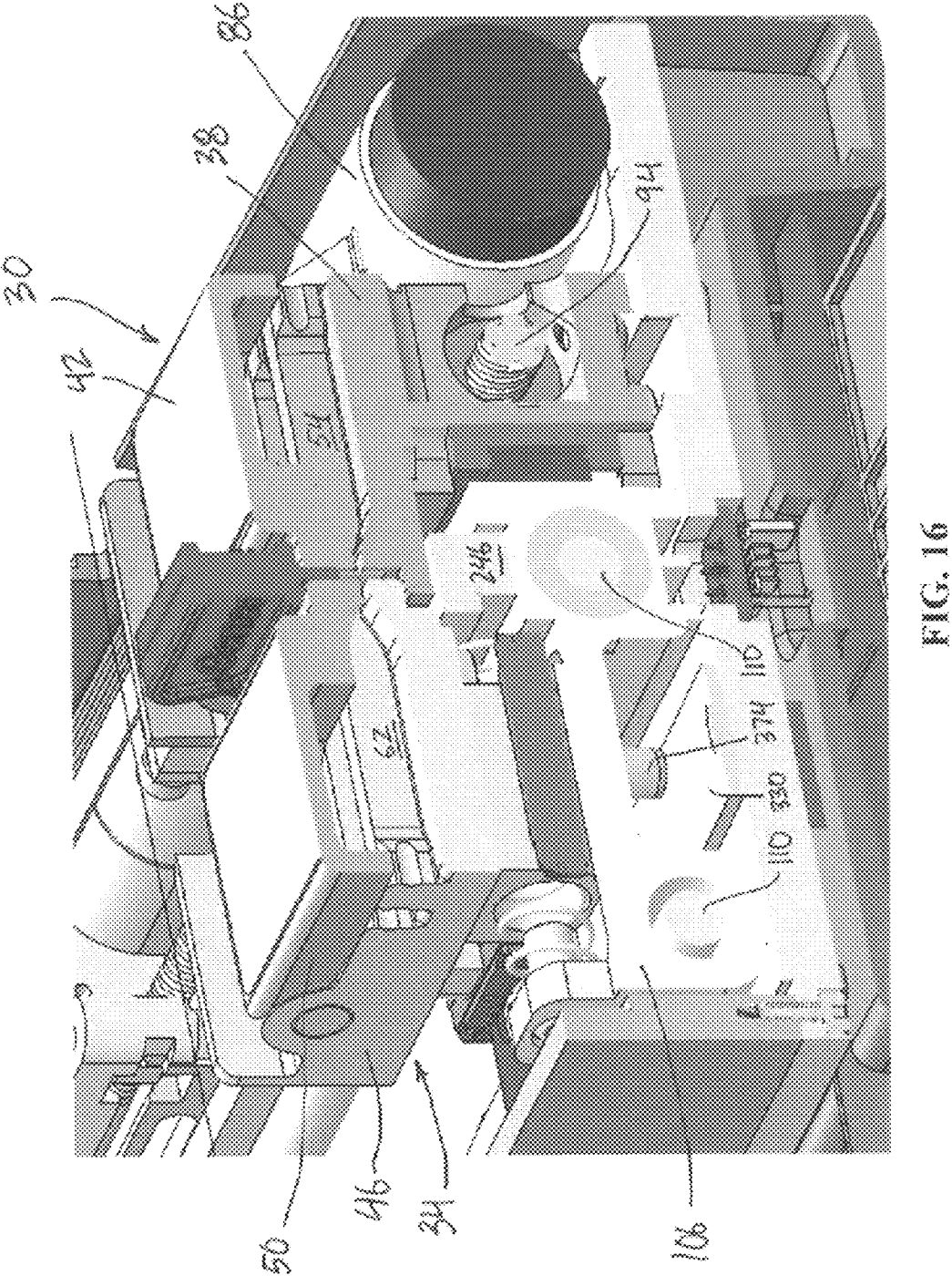
FIG. 16 is a partial sectional view of the welding device of FIG. 15, illustrated in a cut configuration and taken along lines 16-16.
Figure 17:
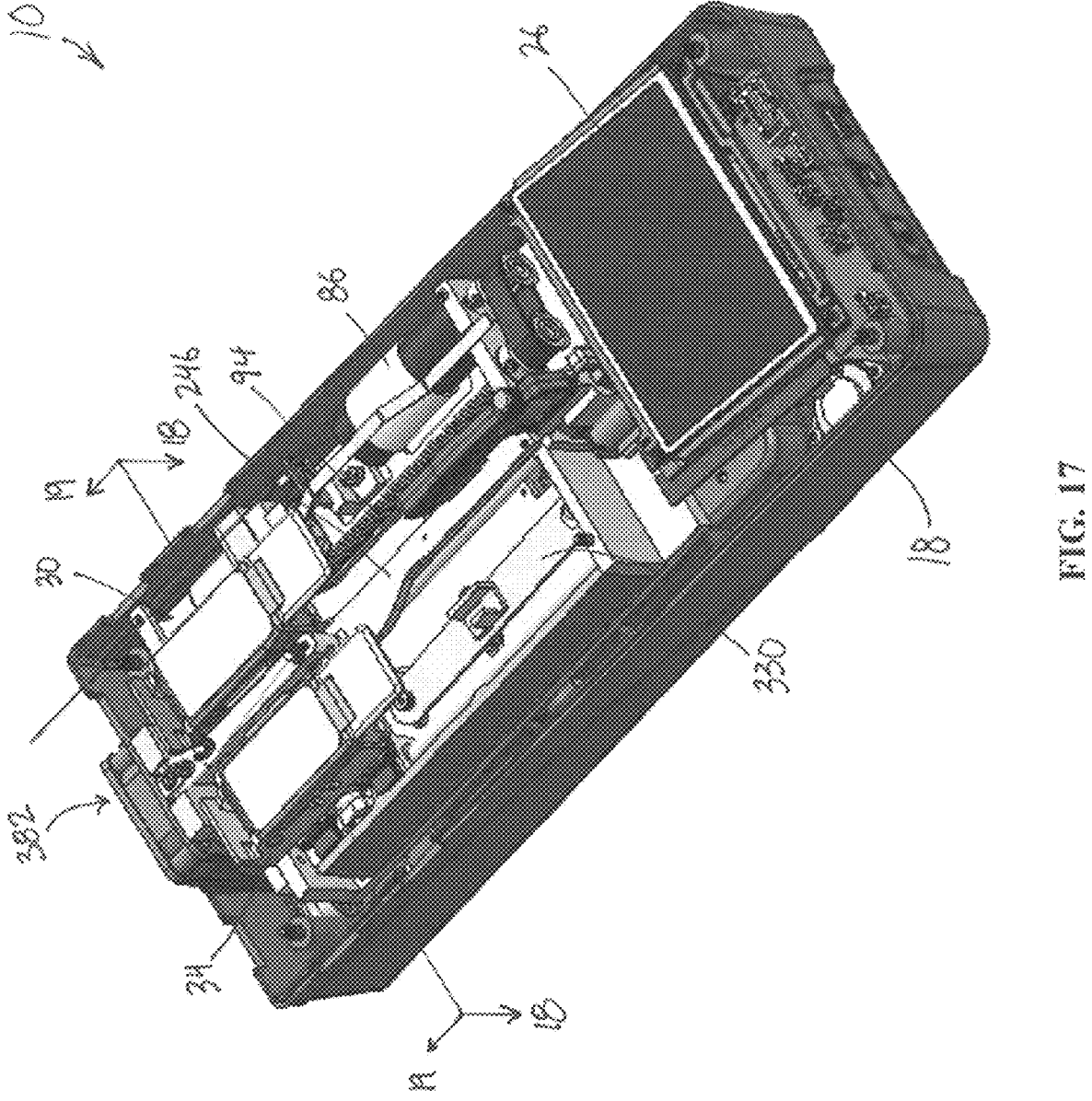
FIG. 17 is a perspective view of the welding device of FIG. 1, illustrated in a heat configuration.
Figure 18:
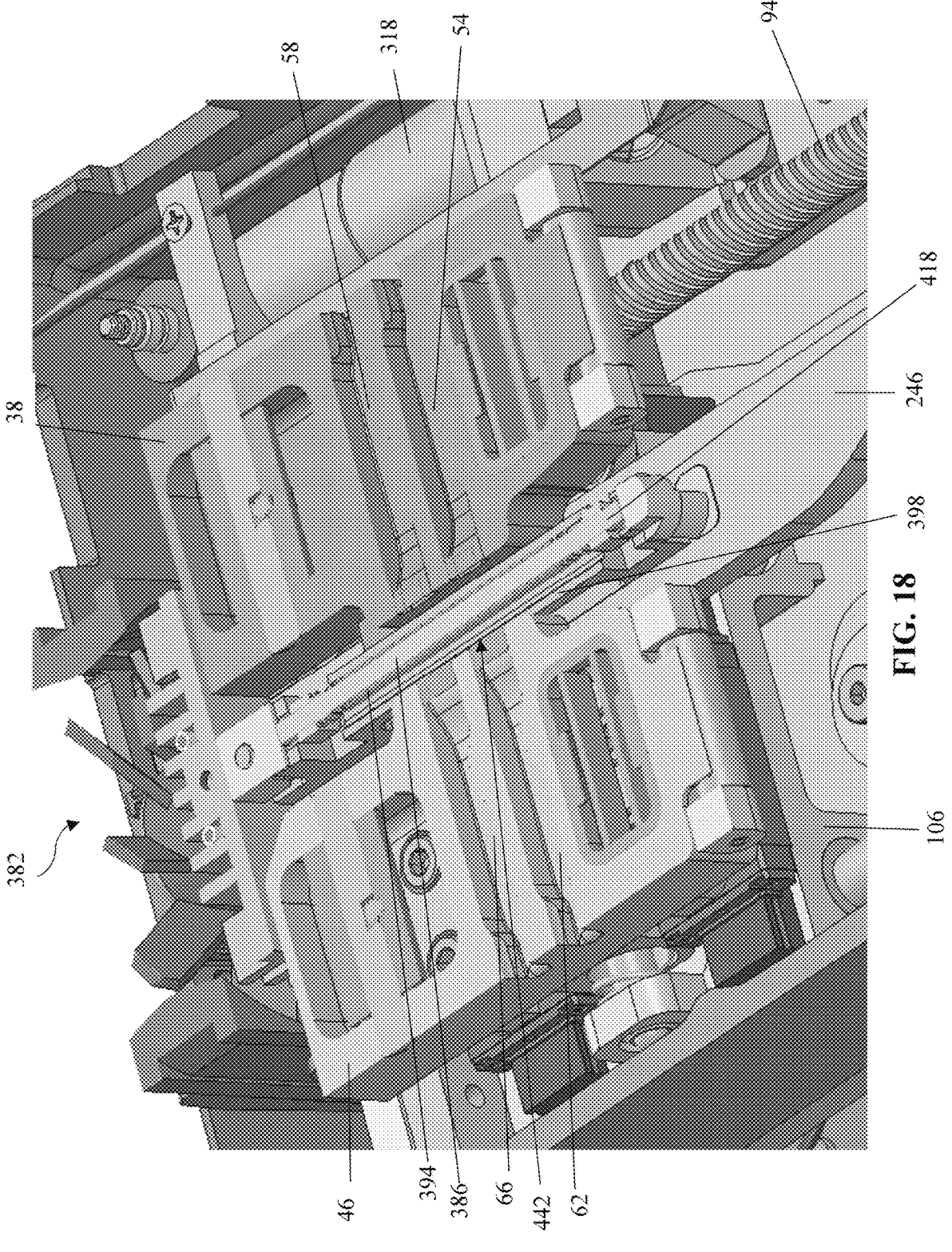
FIG. 18 is a partial sectional view of the welding device of FIG. 17, illustrated in a heat configuration and taken along lines 18-18.
Figure 19:
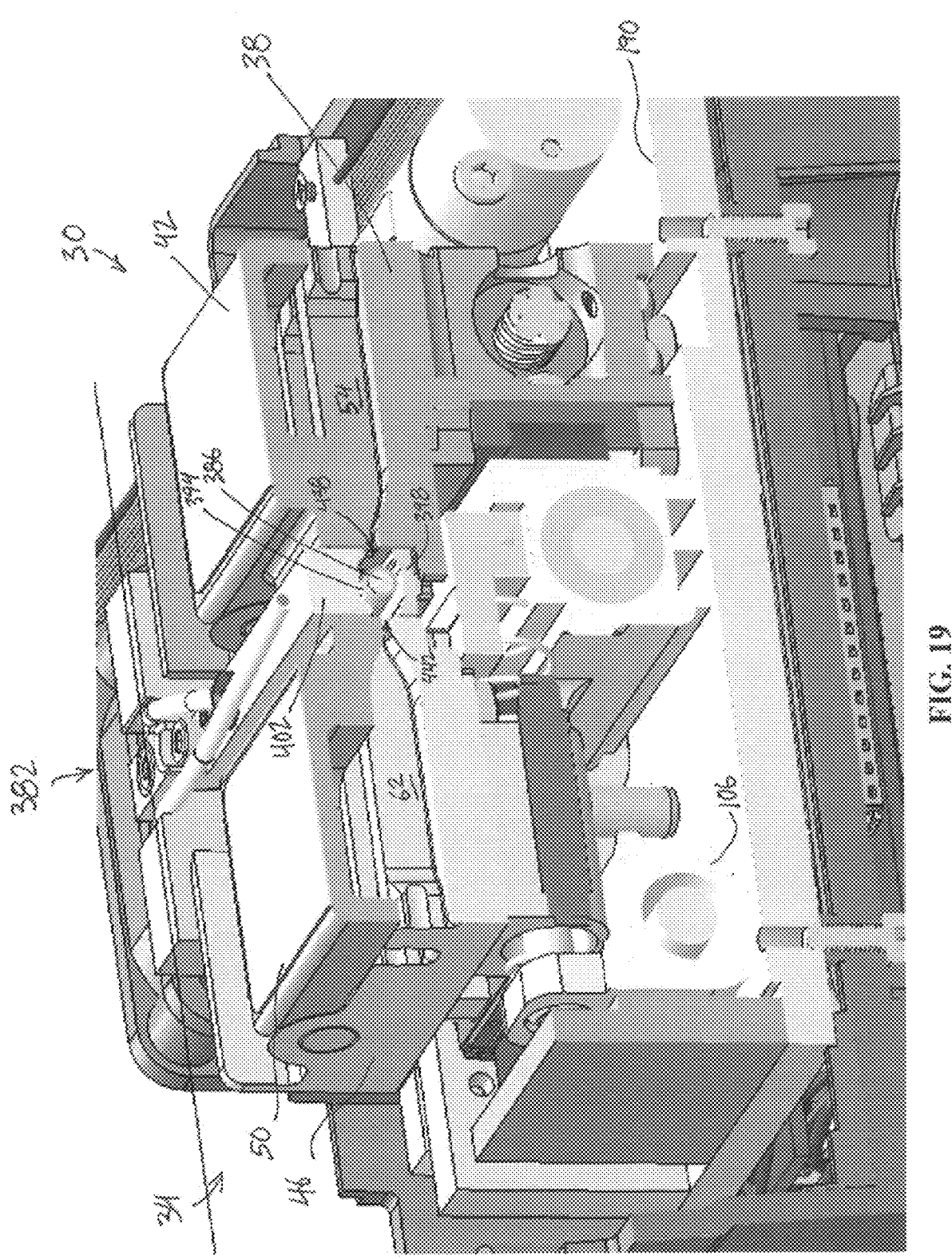
FIG. 19 is a partial sectional view of the welding device of FIG. 17, illustrated in a heat configuration and taken along lines 19-19.
Figure 20:
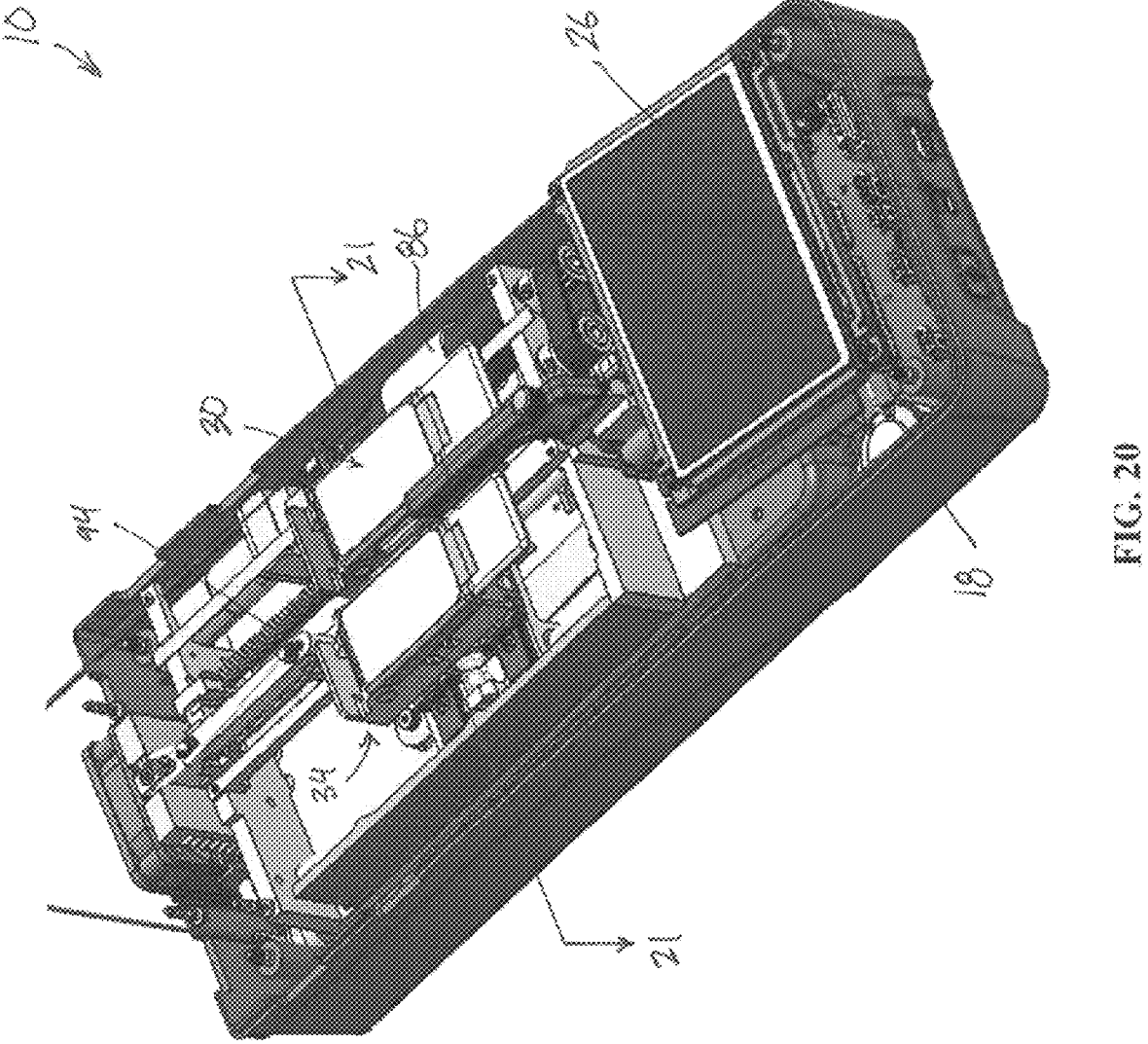
FIG. 20 is a perspective view of the welding device of FIG. 1, illustrated in a weld configuration.

As explained in further detail herein, after the tubes T1, T2 are secured with the clamps 30, 34, the welding device 10 goes through an operation cycle that results in the tubes T1, T2 being welded together. In general, the operation cycle for the welding device 10 of the illustrated embodiment includes a load configuration (FIG. 2) to load the tubes, a cut configuration (FIGS. 15 and 16) to cut the tubes, a heat configuration (FIGS. 17-19) that heats the tubes, a weld configuration (FIGS. 20, 21) that welds the heated tubes ends together, and a home configuration (FIG. 22) that resets the welding device 10 in preparation for another operation cycle. U.S. Pat. No. 7,398,813 discloses a device for welding plastic tubes with an operational cycle and is incorporated herein by reference. Further discussion of how the tubes T1, T2 and tube clamps 30, 34 of the present disclosure move throughout the operation cycle is provided herein.

Figure 4:
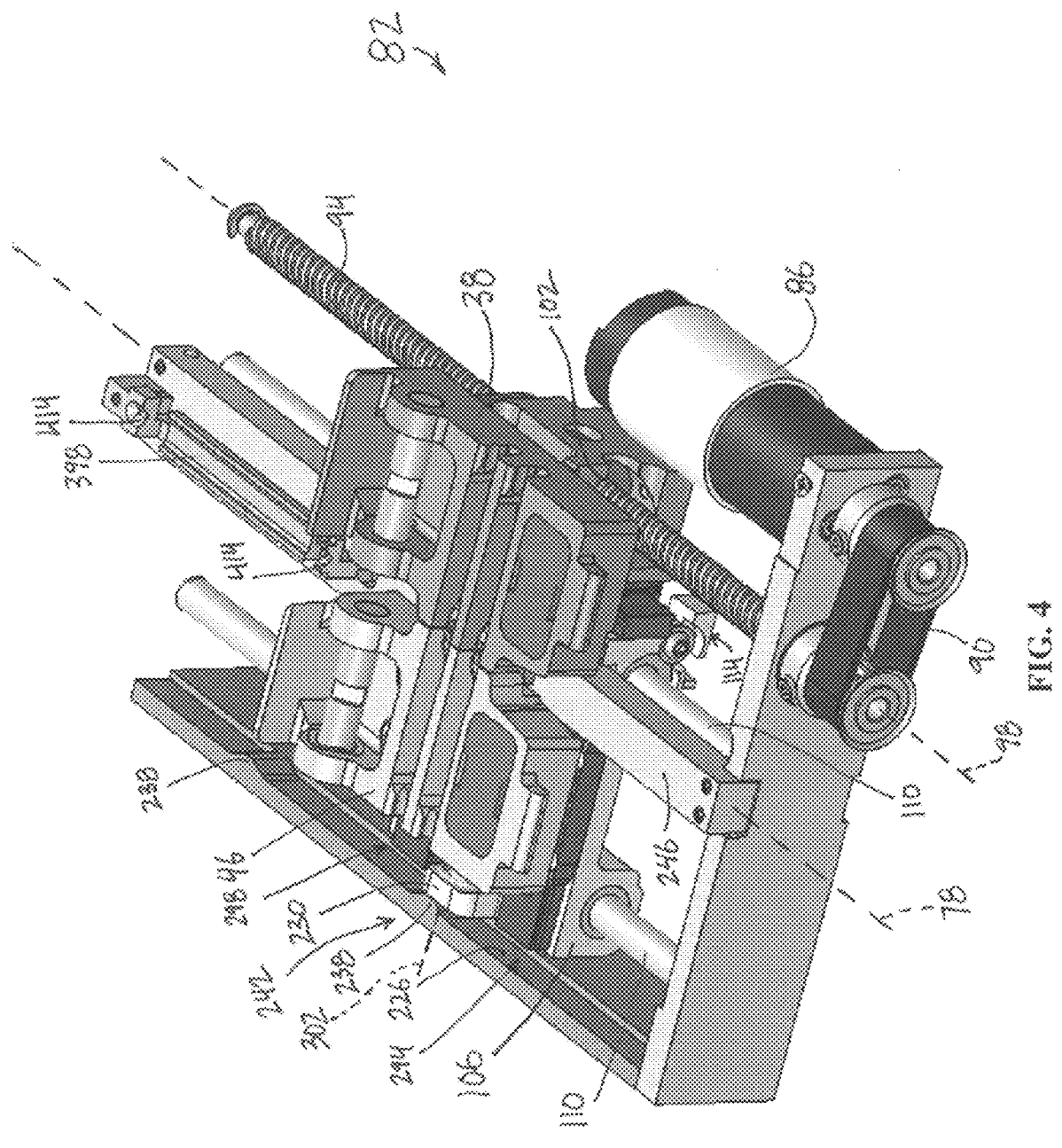
FIG. 4 is a top perspective view of a main drive assembly of the welding device of FIG. 1.

With reference to FIG. 4, the first clamp block 38 and the second clamp block 46 are configured to be driven along an axis 78 (e.g., a front-to-back longitudinal axis) by a main drive assembly 82. The main drive assembly 82 includes a motor 86 that is energized to rotationally drive a transmission 90, which in the illustrated embodiment is a belt drive. The motor 86, through the transmission 90, is configured to rotate a screw 94 about an axis 98 of the screw 94. The first clamp block 38 includes a threaded bore 102 that receives the screw 94 such that rotation of the screw 94 causes the first clamp block 38 to translate along the axis 98. In the illustrated embodiment, the axis 78 and the axis 98 of the screw 94 are parallel.

Figure 5A:
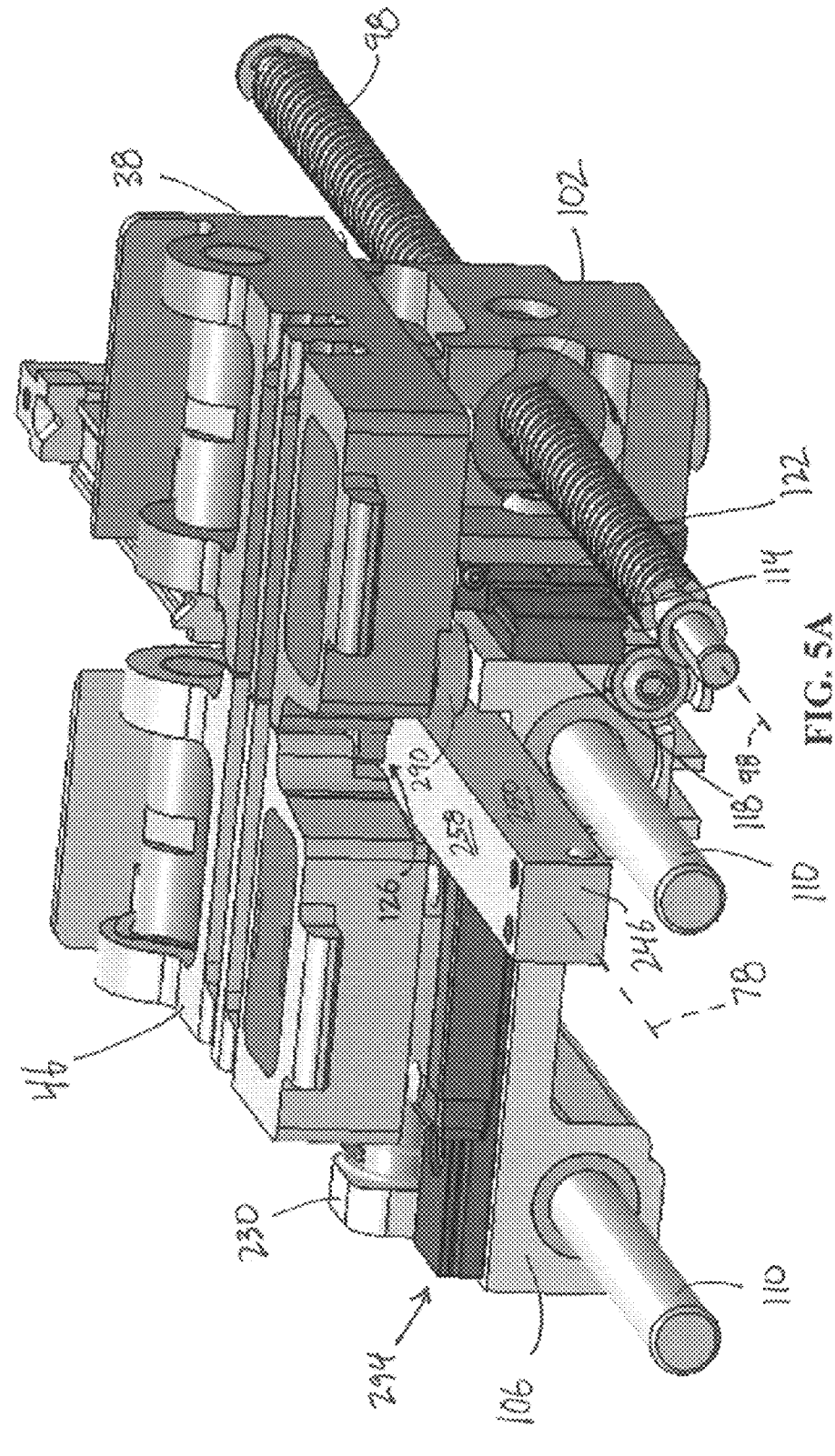
FIG. 5A is a right perspective view of the main drive assembly of FIG. 4 with portions removed for clarity.

With continued reference to FIGS. 4 and 5A, the second clamp block 46 is driven to translate along the axis 78 by interfacing with the first clamp block 38. The main drive assembly 82 further includes a carriage 106 upon which the second clamp block 46 is supported. The carriage 106 is coupled to the first clamp block 38. Specifically, the carriage 106 in the illustrated embodiment slides along guide shafts 110. In the illustrated embodiment, the guide shafts 110 are parallel to the axis 98 of the screw 94 (and the axis 78).

With continued reference to FIG. 5A, a slide rail 114 couples the first block 38 to the carriage 106. In the illustrated embodiment, the slide rail 114 includes a tongue 118 secured to the carriage 106 and a groove 122 secured to the first block 38. The tongue 118 is at least partially received within the groove 122. The tongue 118 is configured to slide relative to the groove 122 for a fixed amount of travel. As such, the slide rail 114 permits relative movement between the first block 38 and the carriage 106 (and correspondingly the second clamp block 46) for a predetermined distance, and when the slide rail 114 reaches the end of permitted travel, the slide rail 114 no longer permits relative movement and couples the first clamp block 38 and the carriage 106 together for co-translation along the axis 78.

Figure 7:
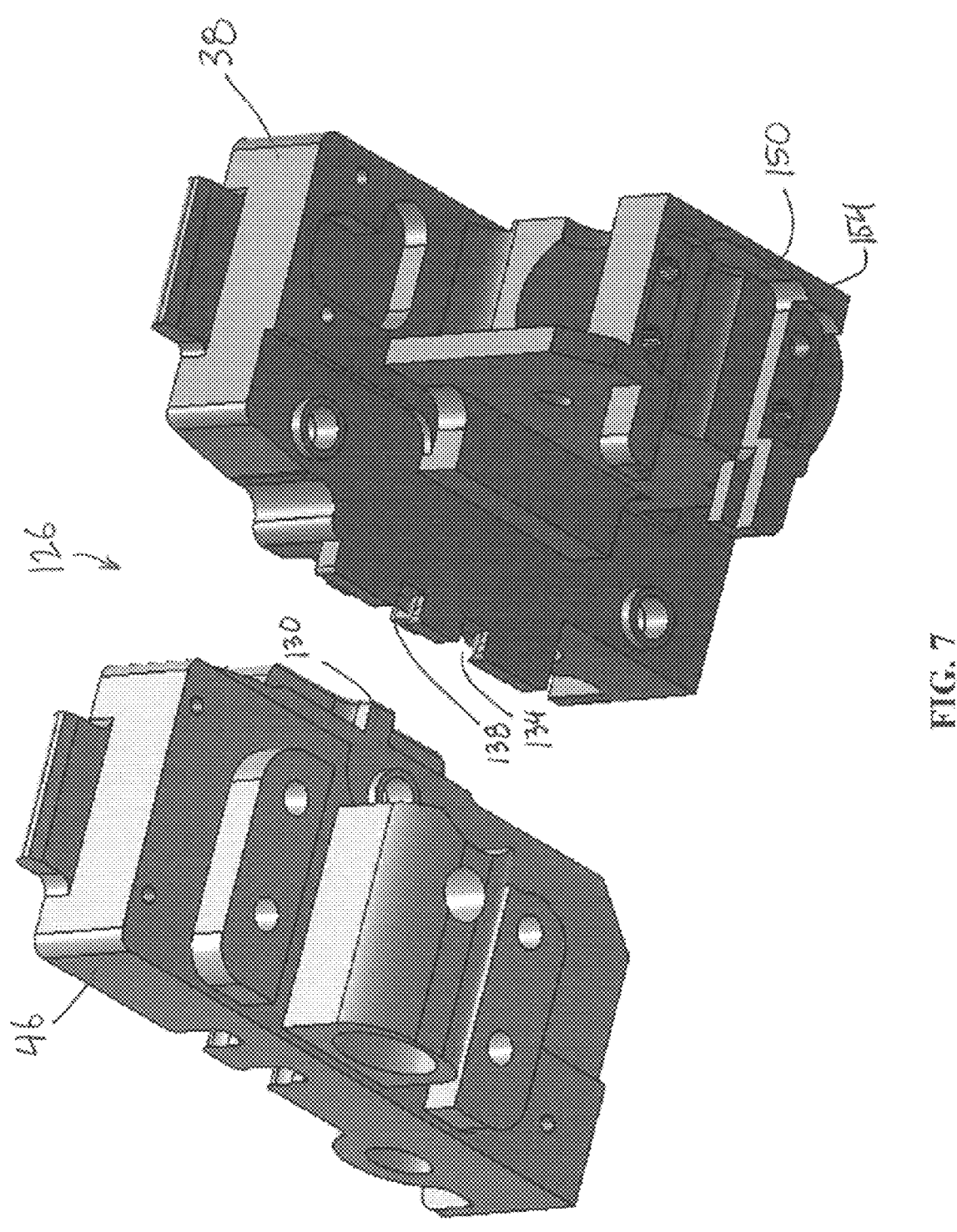
FIG. 7 is a bottom perspective view of the first and second clamp blocks.

With reference to FIG. 7, the first clamp block 38 and second clamp block 46 are configured to engage each other for co-translation via an interface 126. In the illustrated embodiment, the interface 126 is a notched interface including a protrusion 130 formed on the second clamp block 46 and a first notch 134 and a second notch 138 formed on the first clamp block 38. The protrusion 130 is receivable within either the first notch 134 or the second notch 138 to lock the blocks 38, 42 together for co-translation. In other words, the first clamp block 38 and the second clamp block 46 are coupled for co-translation along the axis 78 when the protrusion 130 is received within either of the notches 134, 138 (i.e., the notched interface 126 is engaged).

Figure 8:
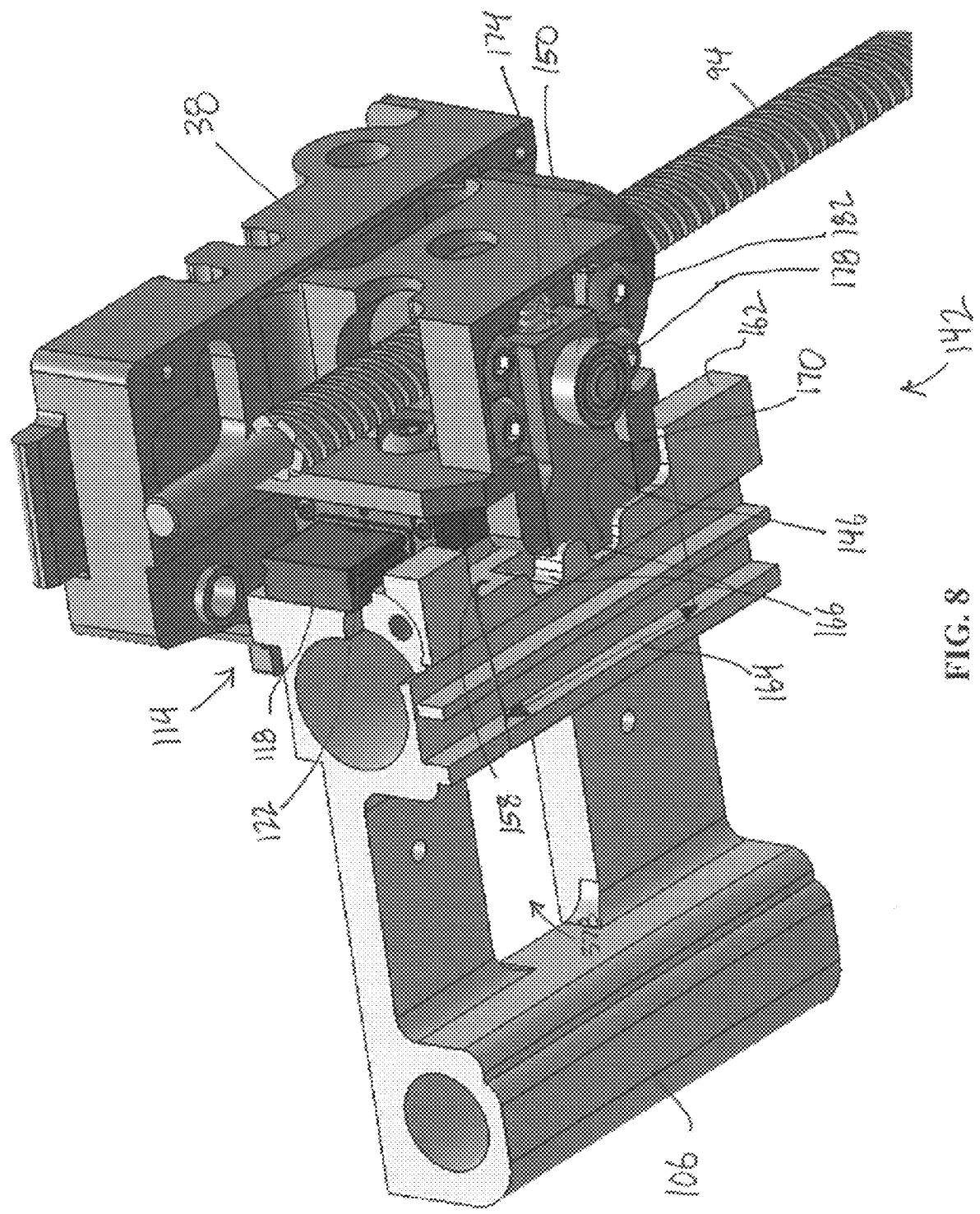
FIG. 8 is a bottom perspective view a first offset assembly including a finger coupled to the first clamp block, shown in an extended position.
Figure 21:
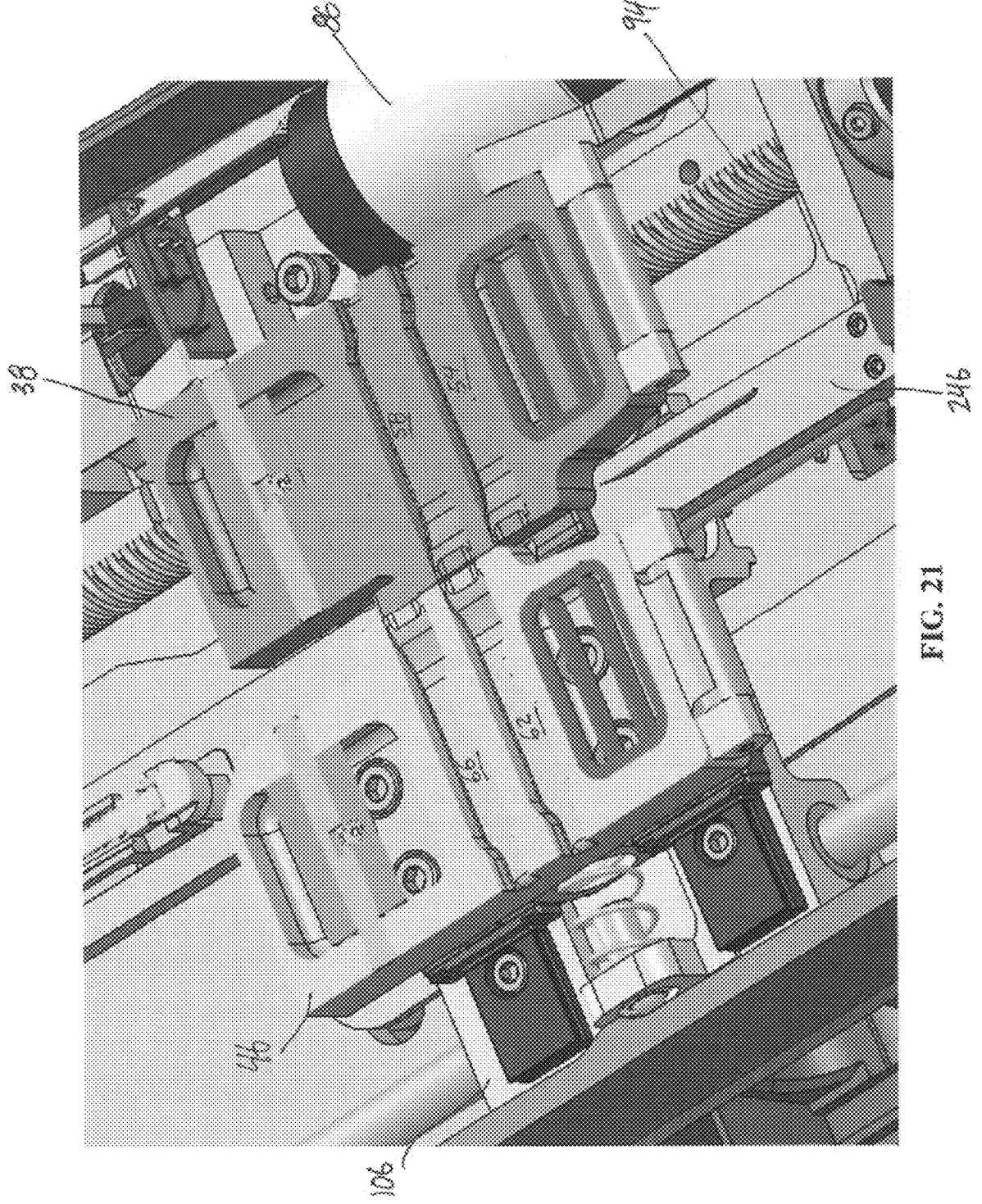
FIG. 21 is a partial sectional view of the welding device of FIG. 20, illustrated in a weld configuration and taken along lines 21-21.
Figure 22:
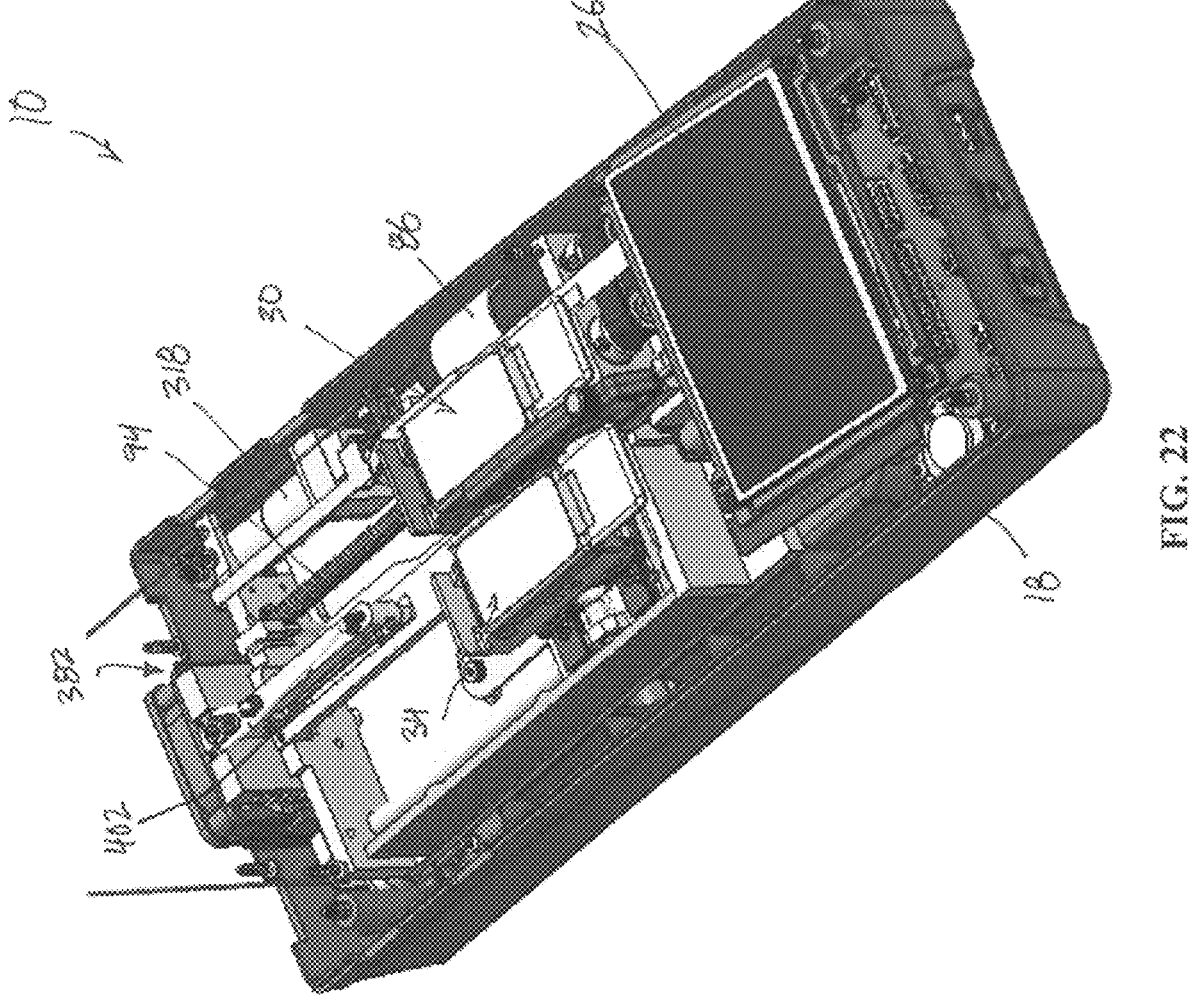
FIG. 22 is a perspective view of the welding device of FIG. 1, illustrated in a home configuration.

With reference to FIG. 8, the first clamp block 38 is movable relative to the carriage 106 via the slide rail 114 and relative movement is controlled, at least in part, by an offset control assembly 142 (i.e., a fore/aft offset control assembly). With the offset control assembly 142 disengaged, the first clamp block 38 is configured to shift or realign with respect to the second clamp block 46. For example, in the weld configuration (FIGS. 20 and 21) the first clamp block 38 is shifted forward relative to the second clamp block 46 such that the second groove 58 of the first clamp block 38 is aligned with the third groove 62 of the second clamp block 46 (FIG. 21). As explain in further detail herein, the shifting the front-to-back relative positions of the blocks 38, 46 aligns the heated or molten ends of the tubes in advance of being welded together.

With continued reference to FIG. 8, the offset assembly 142 includes a finger 146 that is slidably coupled to the first clamp block 38. In the illustrated embodiment, the finger 146 is at least partially received within a recess 150 formed in a bottom surface 154 of the first clamp block 38. A groove 158 is formed in a side surface 162 of the carriage 106 that faces the first clamp block 38. The groove 158 in the illustrated embodiment extends a distance 164 and includes two notches 166. At least a portion of the first clamp block 38 and the finger 146 are received within the groove 158. In addition, the finger 146 includes a protrusion 170 that is receivable within either of the notches 166. A spring 174 biases the finger 146 into an extended position (FIG. 8) in which the protrusion 170 is received within the notch 166 formed on the carriage 106. As explained in further detail herein, the finger 146 includes a post 178 with a bearing 182 that is acted upon to cause the finger 146 to move to a retracted position, in which that the protrusion 170 is removed from the notch 166. As such, the first clamp block 38 is permitted to slide relative to the carriage 106 the distance 164 of the groove 158, which defines the travel limit of the slide rail 114 when the finger 146 is retracted. When the finger 146 is extended, the first block 38 is coupled to the carriage 106 for co-translation along the axis 78.

Figures 9A, 9B, 9C, 9D, 9E:
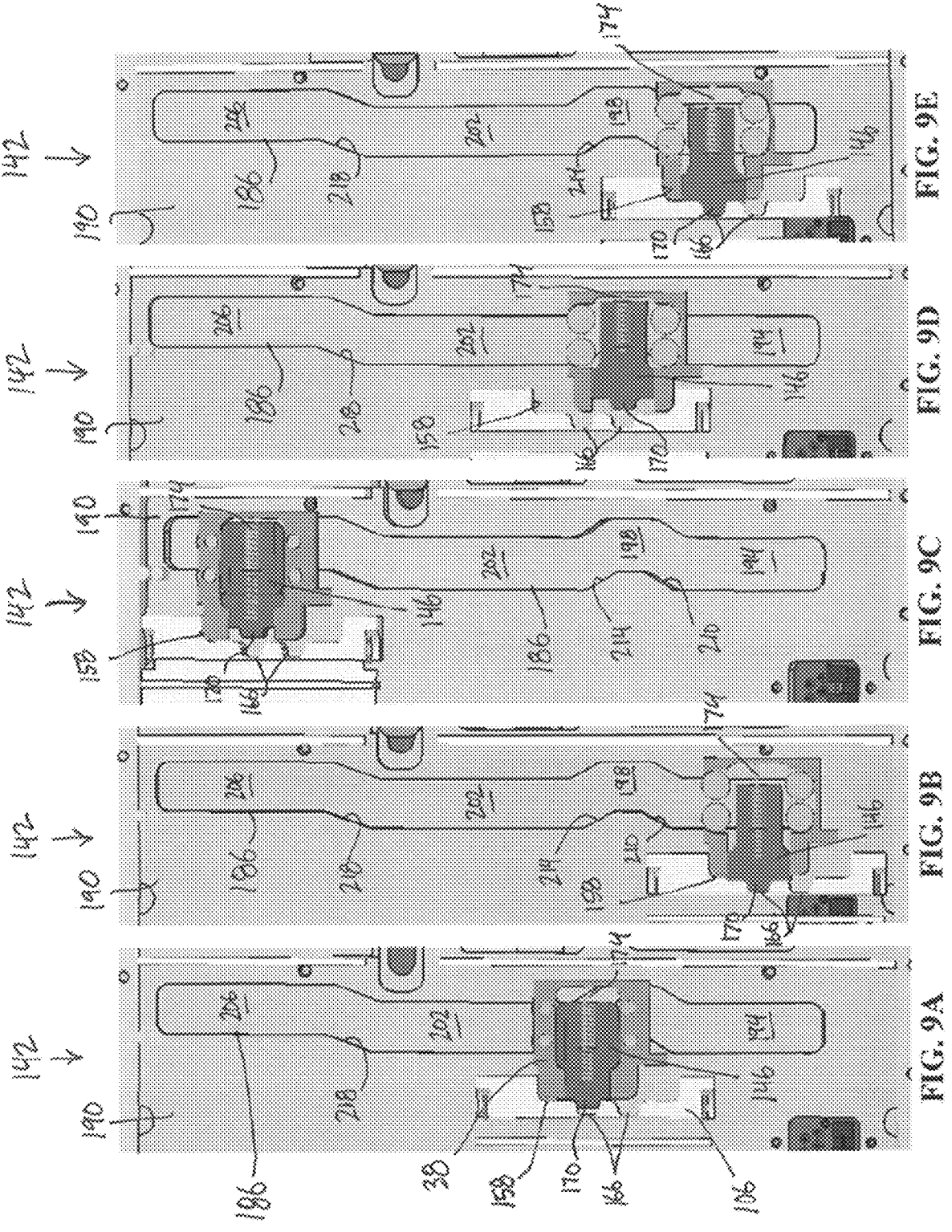
FIG. 9A is a partial sectional view of the first offset assembly, illustrated with the welding device in a load configuration.
FIG. 9B is a partial sectional view of the first offset assembly, illustrated with the welding device in a cut configuration.
FIG. 9C is a partial sectional view of the first offset assembly, illustrated with the welding device in a heat configuration.
FIG. 9D is a partial sectional view of the first offset assembly, illustrated with the welding device in a weld configuration.
FIG. 9E is a partial sectional view of the first offset assembly, illustrated with the welding device in a home configuration.

With reference to FIGS. 9A-9E, cross-sectional views illustrate the carriage 106, the finger 146, and the first clamp block 38 through the operation cycle of the load configuration (FIG. 9A), the cut configuration (FIG. 9B), the heat configuration (FIG. 9C), the weld configuration (FIG. 9D), and the home configuration (FIG. 9E). The post 178 and the bearing 182 on the bottom side of the finger 146 are received within a slot 186 formed in a base plate 190. The bearing 182 slides along the slot 186 and causes the finger 146 to retract against the bias of the spring 174 when the finger 146 is located at certain positions along the slot 186. In other words, in response to the first clamp block 38 translating along the axis 78 with respect to the screw 94, the post 178 also translates within the slot 186. The slot 186 translates the post 178 against the spring bias to move the finger to a retracted position (FIGS. 9C and 9D), and as such the first clamp block 38 is free to translate with respect to the carriage 106. For relative motion between the first clamp block 38 and the second clamp block 46 to occur along the axis 78, the finger 146 is retracted, and the blocks 38, 46 are separated from each other (as explained in further detail herein) such that the interface 126 is disengaged (i.e., the protrusion 130 is removed from the notches 134, 138).

With continued reference to FIGS. 9A-9E, the slot 186 includes a first portion 194, a second portion 198, a third portion 202, and a fourth portion 206. The second portion 198 is positioned between the first portion 194 and the third portion 202. The third portion 202 is positioned between the second portion 198 and the fourth portion 206. The slot 186 in the illustrated embodiment also includes a first ramp 210 positioned between the first portion 194 and the second portion 198, a second ramp 214 positioned between the second portion 198 and the third portion 202, and a third ramp 218 positioned between the third portion 202 and the fourth portion 206. In the illustrated embodiment, the second portion 198 and the fourth portion 206 of the slot 186 are positioned further away from the carriage 106 (i.e., further to the right from the frame of reference of FIGS. 9A-9E) than the first portion 194 and the third portion 202.

Figure 5B:
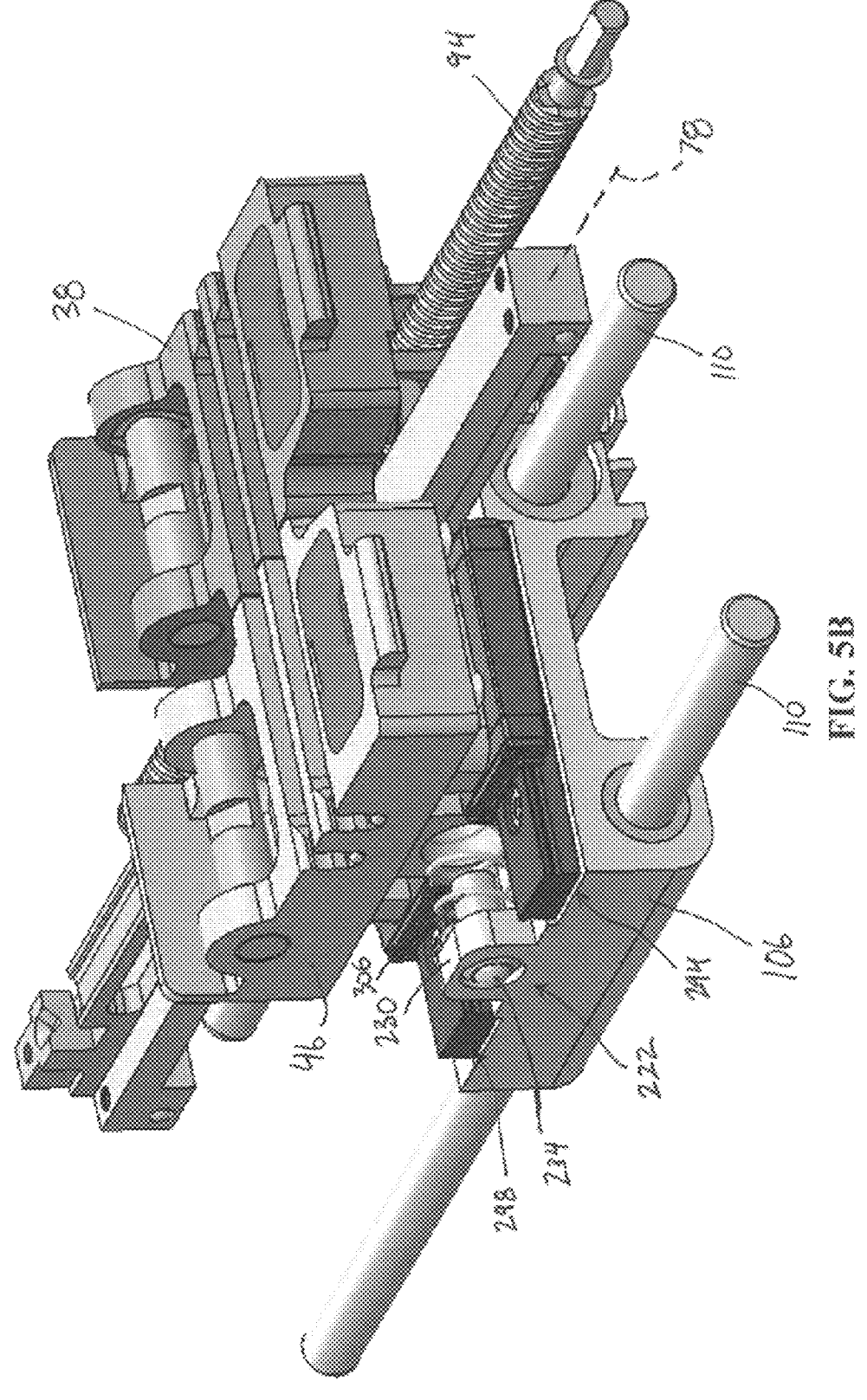
FIG. 5B is a left perspective view of the main drive assembly of FIG. 5A.

With reference to FIGS. 4 and 5B, a ball plunger 222 is coupled to the carriage 106 and is engaged with a side rail 226. Specifically, the ball plunger 222 is received within a mounting flange 230 formed on the carriage 106 such that a ball 234 of the ball plunger 222 extends from (i.e., protrudes from) the mounting flange 230. The ball 234 slides along the side rail 226 and protrusions 238 formed in the side rail 226 engage the ball 234 to temporarily stall or slow down the carriage 106 (and correspondingly the second clamp block 46) along the axis 78. In other words, the protrusions 238 are utilized to initiate relative motion along the axis 78 between the clamp blocks 38, 46. The protrusions 238 are configured to temporarily stop translation of the carriage 106 until a threshold force is reached and the ball 234 of the ball plunger 222 deflects away from the protrusion 238. As such, the protrusions 238 and the ball plunger 222 create a detent 242. In other words, the detent 242 includes the ball plunger 222 coupled to the carriage 106 and the rail 226 along which the ball plunger 222 slides. As explained, the ball 234 of the ball plunger 222 abuts the protrusions 238 such that the detent 242 temporarily stops translation of the carriage 106 until the threshold force is reached.

Figure 6:
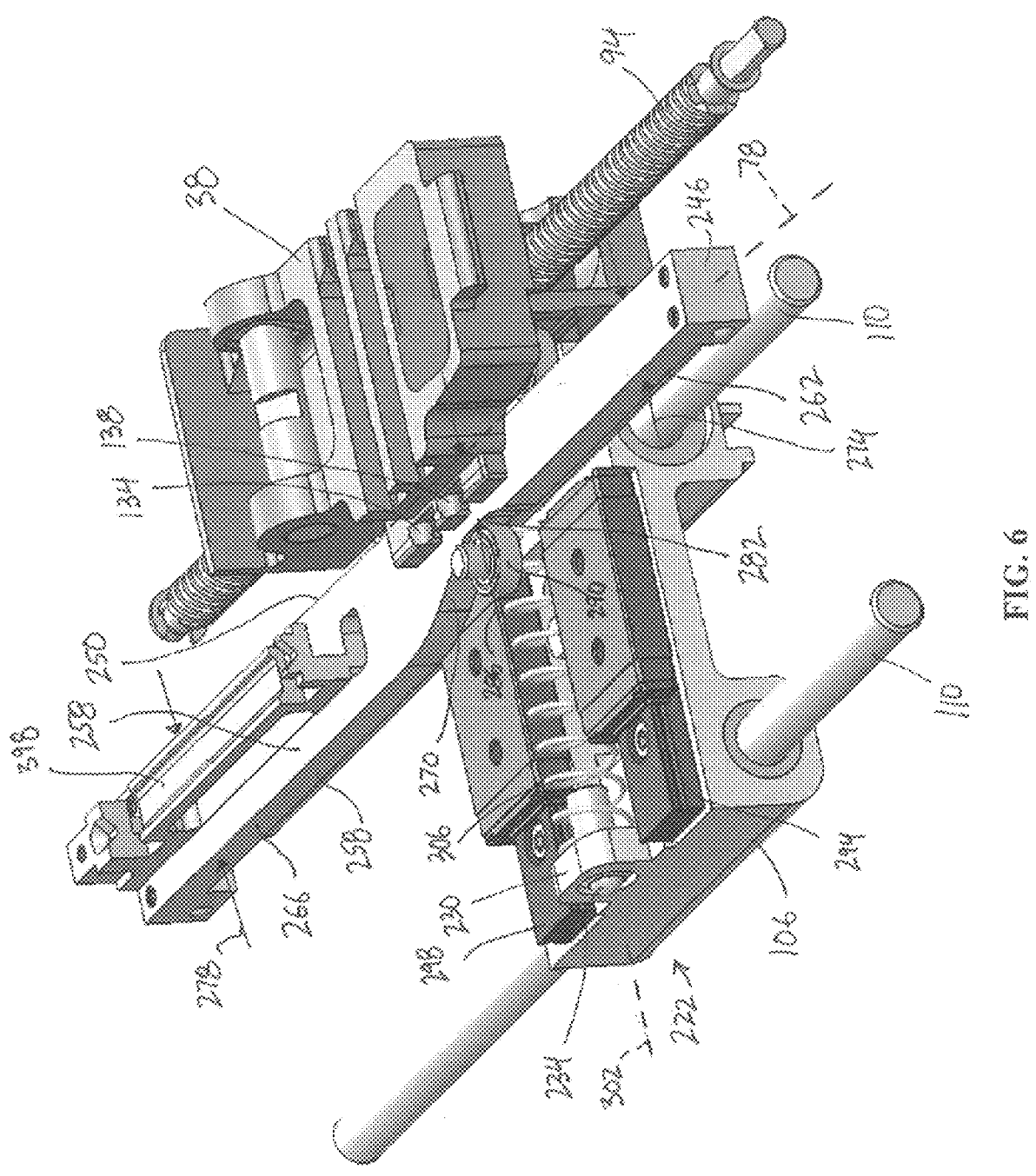
FIG. 6 is a left perspective view of the main drive assembly with portions removed to illustrate a surface of a rail.

With reference to FIGS. 4 and 5A, a rail 246 is positioned between the first clamp block 38 and the second clamp block 46. In the illustrated embodiment, the rail 246 is a center rail. The rail 246 includes a first surface 250 facing the first clamp block 38 and a second surface 254 facing the second clamp block 46. A top surface 258 of the rail 246 extends between the first surface 250 and the second surface 258. With reference to FIG. 6, the first surface 250 in the illustrated embodiment is planar. In the illustrated embodiment, the first surface 250 extends parallel to the axis 78. The second surface 254 is non-planar (i.e., arcuate). In the illustrated embodiment, the second surface 254 includes a first planar portion 262, a second planar portion 266, and a transition 270 positioned between the planar portions 262, 266. The rail 246 defines a first width 274 between the first surface 250 and the second surface 254 at a first location along the axis 78, and a second width 278 between the first surface 250 and the second surface 254 at a second location along the axis 78. In addition, in the illustrated embodiment, the transition 270 includes a valley 282 with a third width 286 (FIG. 12) between the first surface 250 and the second surface 254. In the illustrated embodiment, the third width 286 is smaller than the first width 274, and the first width 274 is smaller than the second width 278. The clamp blocks 38, 46 abut the rail 246 with bearings 290 and translate along the rail 246. More specifically, the bearings 290 extend from a lower surface of the clamp blocks 38, 46 and slide along the first surface 250 and the second surface 254 of the rail 246 as the clamp blocks 38, 46 are driven to translate along the axis 78.

Figure 5C:
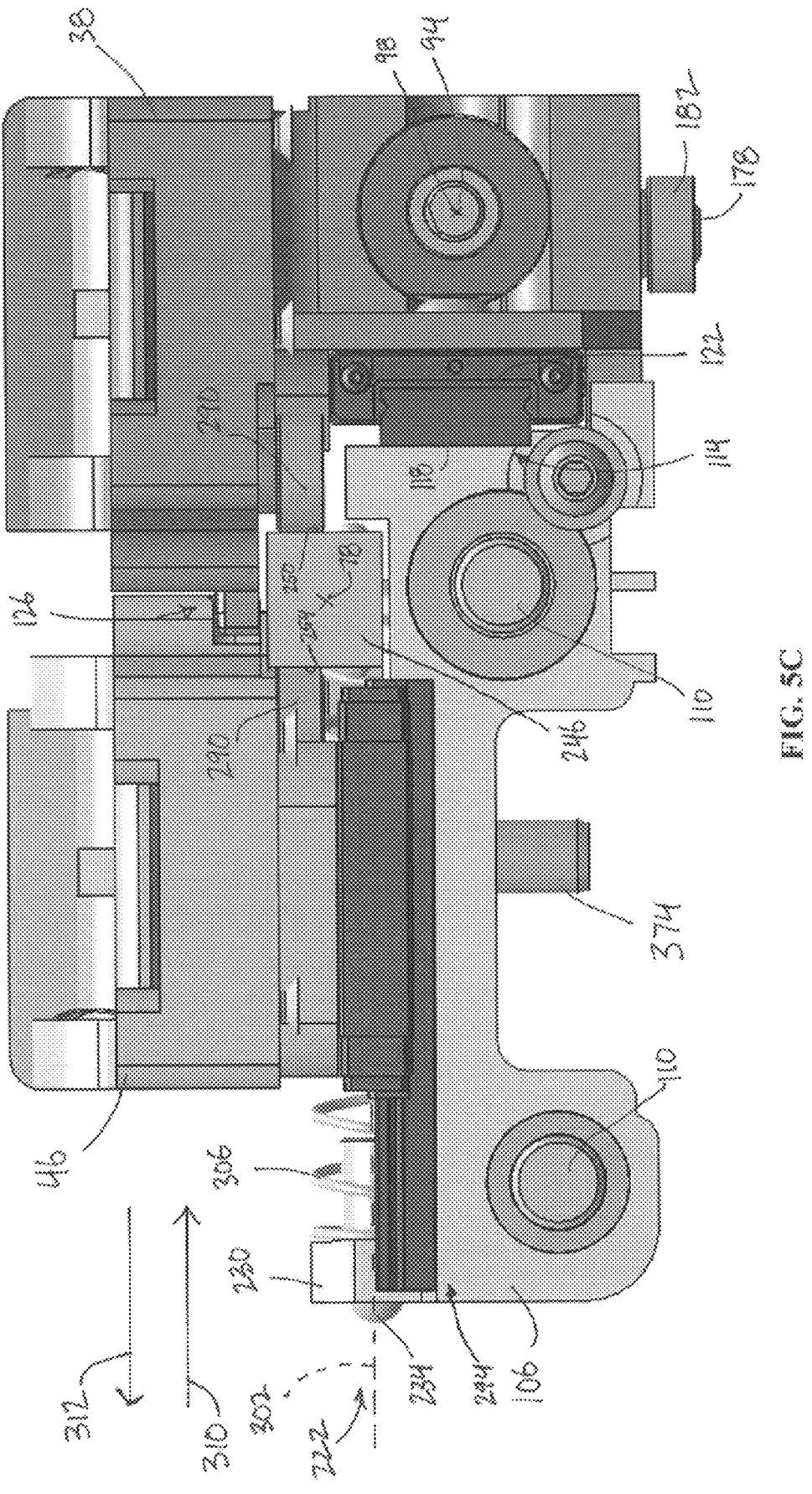
FIG. 5C is a front view of the main drive assembly of FIG. 5A.

With reference to FIG. 5C, the first clamp block 38 is affixed laterally (i.e., left to right as viewed in FIG. 5C) with respect to the rail 246, with the bearing 290 sliding along the first surface 250. Because the first surface 250 of the rail 246 is planar, the distance between the first clamp block 38 and a center of the rail 246 (i.e., the axis 78) remains constant.

With reference to FIG. 5B, the second clamp block 46 is slidably coupled to the carriage 106. A first side slide rail 294 and a second side slide rail 298 couples the second clamp block 46 to the carriage 106 such that the second clamp block 46 is configured to move along an axis 302. A spring 306 biases the second clamp block 46 in a first direction 310 along the axis 302 (i.e., towards the rail 246). In the illustrated embodiment, the second axis 302 is orthogonal to the axis 78.

Because the second surface 254 of the rail 246 is non-planar, the distance between the second clamp block 46 and the center of the rail 246 (i.e., the axis 78) varies as the second clamp block 46 translates along the axis 78. In other words, the second clamp bock 46 moves towards and away from the first clamp block 38 depending on where the bearing 290 of the second clamp block 46 is positioned along the second surface 254. For example, the second clamp block 46 is positioned furthest away from the first clamp block 38 when the bearing 290 is along the second planar portion 254 (i.e., associated with a heat configuration). Also, the second clamp block 46 is positioned closest to the first clamp block 38 when the bearing 290 is positioned along the valley 282 (i.e., associated with a load configuration).

The rail 246 advantageously provides a central datum for moving components in the tube welder 10 to be referenced from. No shims are necessary to align components or adjust the relative positioning of components because the rail 246 provides a fixed reference point for any moving components in any of the configurations. As such, the rail 246 allows for the tube welder 10 to be manufactured and assembled more efficiently. In addition, the rail 246 is configured to permit the clamps 30, 34 to translate along the axis 302, while also permitting the clamps 30, 34 to float to various weld cycle locations.

Figure 10:
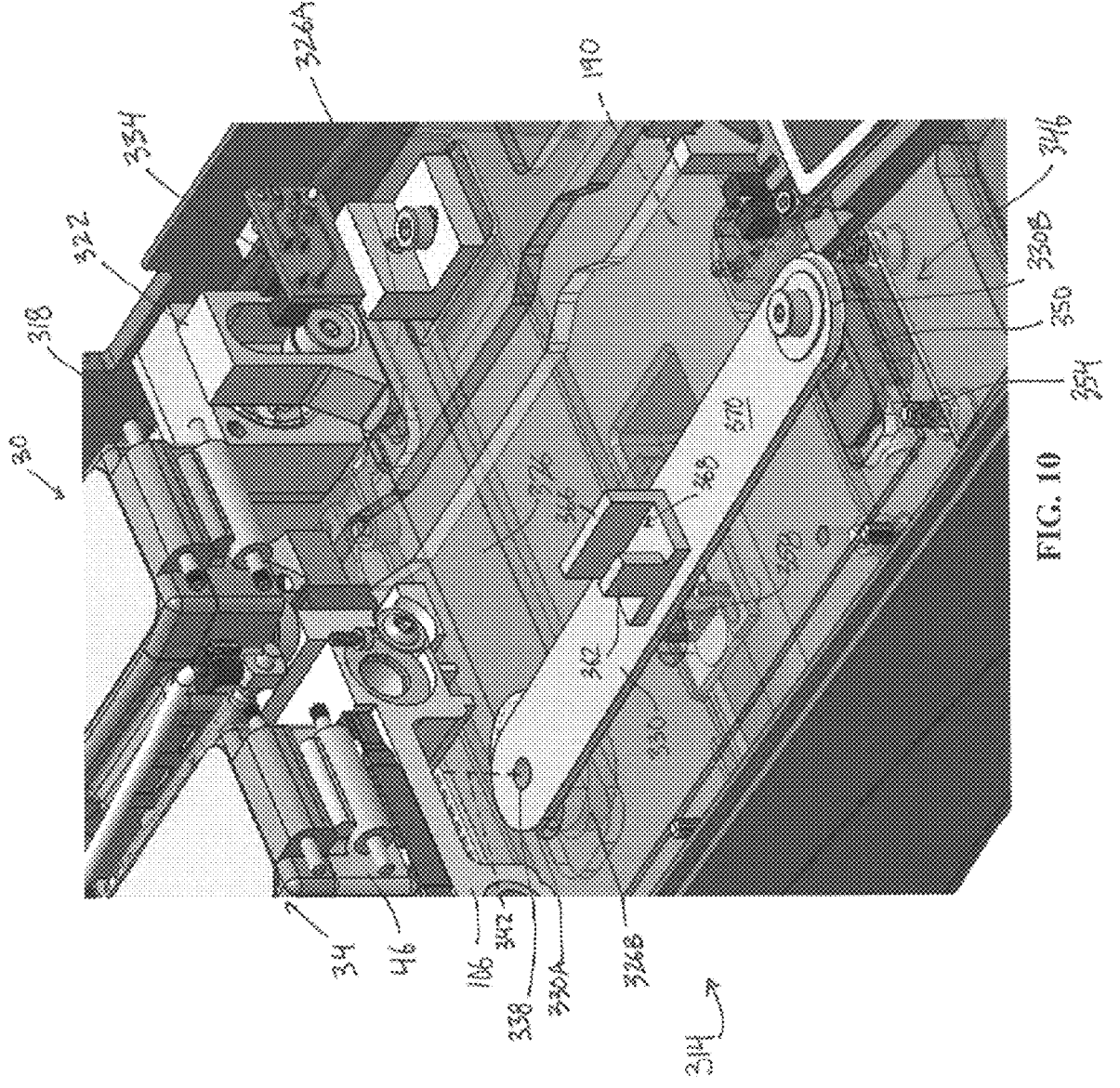
FIG. 10 is a partial perspective view of a linkage, with a base plate shown transparently for clarity.

With reference to FIG. 10, the tube welder 10 includes a linkage 314 operatively configured to translate the second clamp block 38 along the axis 302. In addition to the second clamp block 46 translating with respect to the first clamp block 38 as the second clamp block 46 translates along the rail 246, the second clamp block 46 also translates towards and away from the rail 246 (and the first clamp block 38) in response to actuation of the linkage 314. In other words, the linkage 314 is configured to move the second clamp block 46 in the first direction 310 (i.e., towards the rail 246) and in a second direction 312 along the axis 302, opposite the first direction 310 (i.e., away from the rail 246).

With continued reference to FIG. 10, the linkage 314 includes an electric motor 318, a transmission 322 coupled to the motor 318, a first bar member 326 coupled to the transmission 322, and a second bar member 330 coupled to the first bar member 326. The transmission 322 transfers rotational motion from the electric motor 318 to linear translation of the first bar member 326. In the illustrated embodiment, the transmission 322 is coupled to a first end 326A of the first bar member 326. As such, rotational output from the motor 318 is translated to linear translation of the first bar member 326. In some embodiments, a sensor 334 is configured to detect the position of the transmission 322. In other embodiments, the sensor is configured to detect the position of a rotor of the motor.

With continued reference to FIG. 10, a first end 330A of the second bar member 330 is coupled to a second end 326B of the first bar member 326 a pivot 338. In the illustrated embodiment, the second bar member 330 is pivotable with respect to the first bar member 326 about a pivot axis 342. The pivot axis 342 translates as the first bar member 326 translates. A second end 330B of the second bar member 330 is pivotably coupled to the base plate 190. A release assembly 346 is coupled to the second end 330B of the second bar member 330 and the release assembly 346 is configured to move (i.e., translate) in response to a force acting on the second bar member 330 exceeding a threshold force (e.g., approximately 53 N+/−10%). In the illustrated embodiment, the release assembly 346 includes a carrier 350 coupled to the second end 330B and a spring 354 positioned between the base plate 190 and the carrier 350 to bias the carrier 350 to a default position. When the second bar member 330 experiences a force greater than the threshold force, the spring bias of the spring 354 is overcome and the carrier 350 (and the second end 330B) translate to prevent any overloading of the linkage 314.

With continued reference to FIG. 10, a sensor 358 is configured to detect the position of the second bar member 330. In the illustrated embodiment, the sensor 358 is configured to detect at least three positions of the second bar member 330. In some embodiments, the output of the sensor 358 is utilized by a microprocessor for control purposes and to ensure the operation cycle of the tube welder 10 is proceeding correctly.

Figures 11A, 11B:
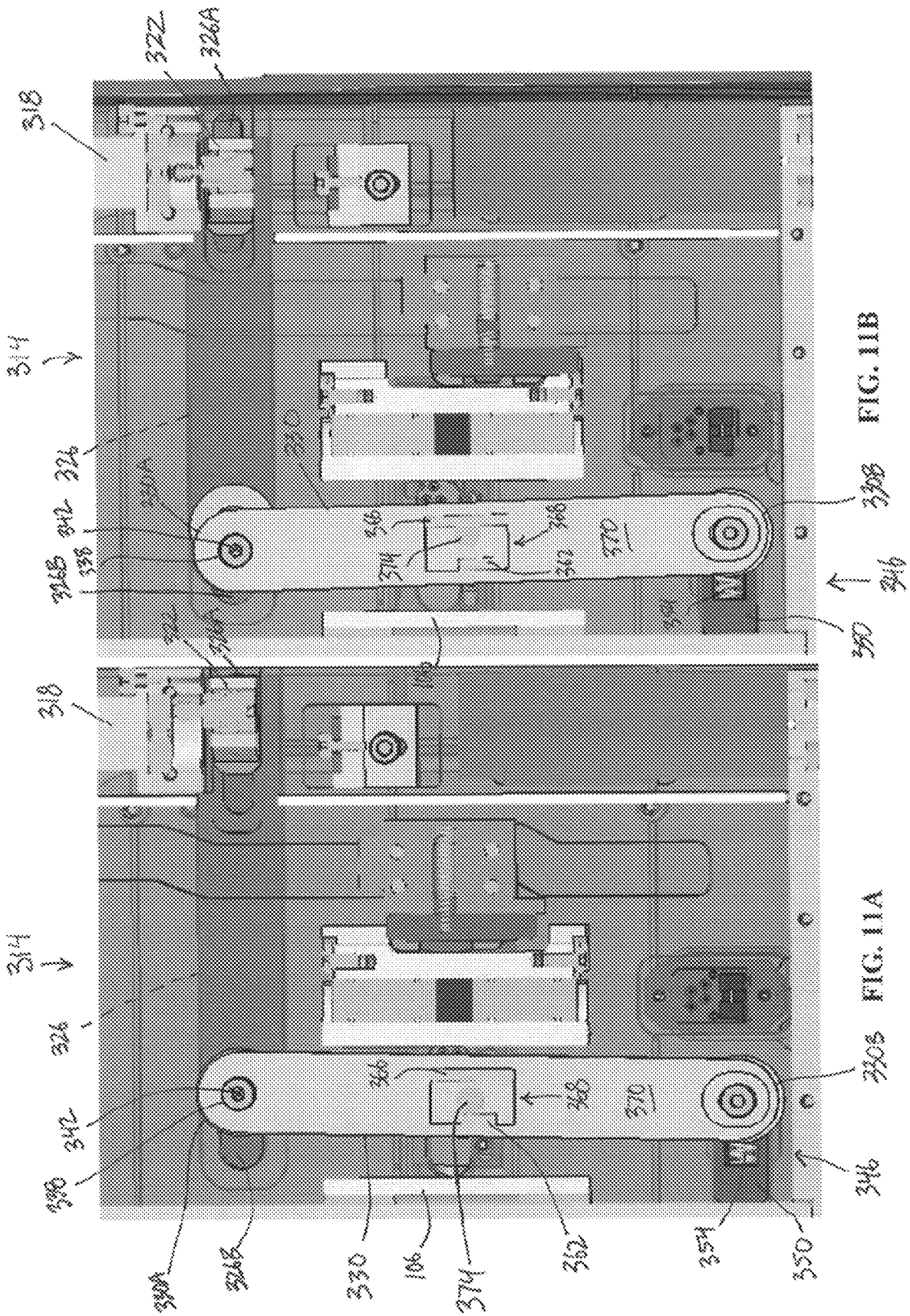
FIG. 11A is a partial sectional view of the linkage, illustrated with the welding device in a load configuration.
FIG. 11B is a partial sectional view of the linkage, illustrated with the welding device in a weld configuration.

With continued reference to FIG. 10, the second bar member 330 includes a first protrusion 362 and a second protrusion 366 extending from a surface 370 of the second bar member 330. A gap 368 is formed between the first protrusion 362 and the second protrusion 366. In the illustrated embodiment, the surface 370 faces away from the base plate 190. The first protrusion 362 and the second protrusion 366 are configured to engage the second clamp block 46. In the illustrated embodiment, the second clamp block 46 includes a post 374 that extends through a window 378 formed in the carriage 106. The first protrusion 362 is configured to engage the post 374 to drive the second clamp block 46 in the first direction 310 (FIG. 11A). Likewise, the second protrusion 366 is configured to engage the post 374 to drive the second clamp block 46 in the second direction 312 (FIG. 11B). In the illustrated embodiment, the post 374 is configured to be at least partially received in the gap 368 between the first protrusion 362 and the second protrusion 366. As such, the second clamp block 46 translates in the first direction 310 along the axis 302 when the first protrusion 362 abuts and drives the post 374, and the second clamp block 46 translates in the second direction 312 along the axis 302 when the second protrusion 366 abuts and drives the post 374.

The linkage 314 is advantageous because it is configured to apply force to the second clamp block 46 in two directions 310, 312 (i.e., both towards and away the first clamp block 38). Applying a force to the second clamp block 46 in the first direction 310 during a load configuration (FIG. 11A) advantageously ensures the second clamp block 46 and the first clamp block 38 are tightly abutted together. This improves the ability of the tube clamps 30, 34 to create a generally fluid free area in the tubes T1, T2. Prior designs, for example, that disclosed in U.S. Pat. No. 8,066,269 incorporated herein, used a cam track to move the clamps left-to-right and had minimal adjustability.

Figure 12:
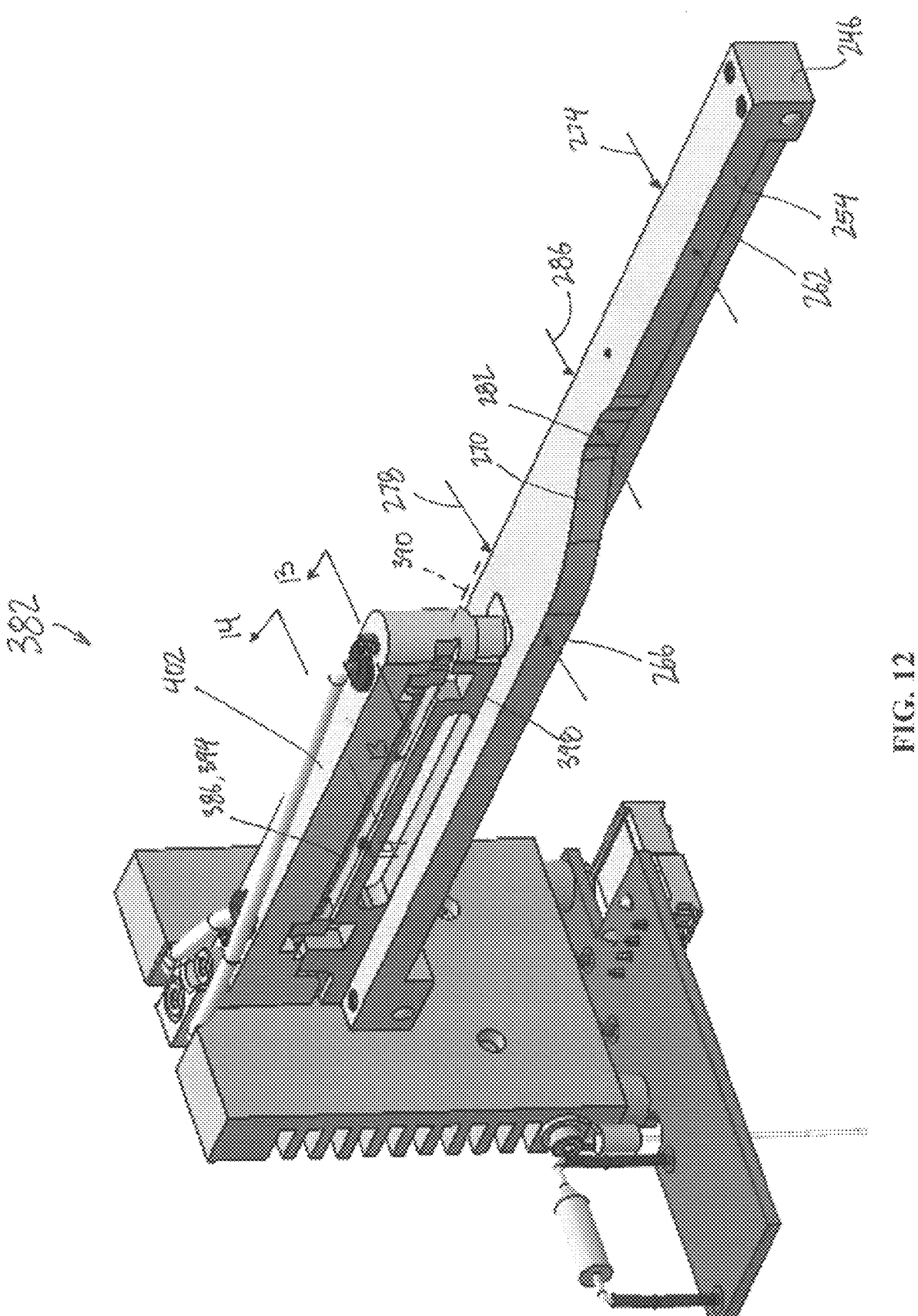
FIG. 12 is a perspective view of a heating assembly.

With reference to FIG. 12, the welding device 10 includes a heater assembly 382. The heater assembly 382 includes a cylindrical core 386 with a longitudinal axis 390, and a winding coil 394 positioned around the core 386. In some embodiments, the core 386 is an alumina ceramic core. In other embodiments, the core is made of non-porous alumina ceramic. In some embodiments, the winding 394 is a nichrome wire. In some embodiments, the winding 394 includes a number of turns within a range of approximately 76 turns to approximately 78 turns. In some embodiments, the winding 394 has a resistance of approximately 5 Ohms at temperatures within a range of approximately 20° C. to approximately 22° C.

With continued reference to FIG. 12, the heater assembly 382 includes a first reflector 398 (i.e., a bottom reflector) and a second reflector 402 (i.e., a top reflector). As used herein, "reflector" refers to a thermal mass that absorbs, conducts, and/or emits thermal energy (e.g., heat). In some embodiments, the reflectors 398, 402 are stainless steel. In the illustrated embodiment, the first reflector 398 extends from the top surface 258 of the rail 246. In some embodiments, the first reflector 398 is integrally formed with the rail 246. The first reflector 398 includes a first surface 406 and the second reflector 402 includes a second surface 410. The core 386 is positioned between the first surface 406 of the first reflector 398 and the second surface 410 of the second reflector 402. In other words, the first reflector 398 and the second reflector 402 at least partially surround the core 386. In the illustrated embodiment, the first surface 406 is arcuate and the second surface 410 is arcuate.

Figures 13, 14:
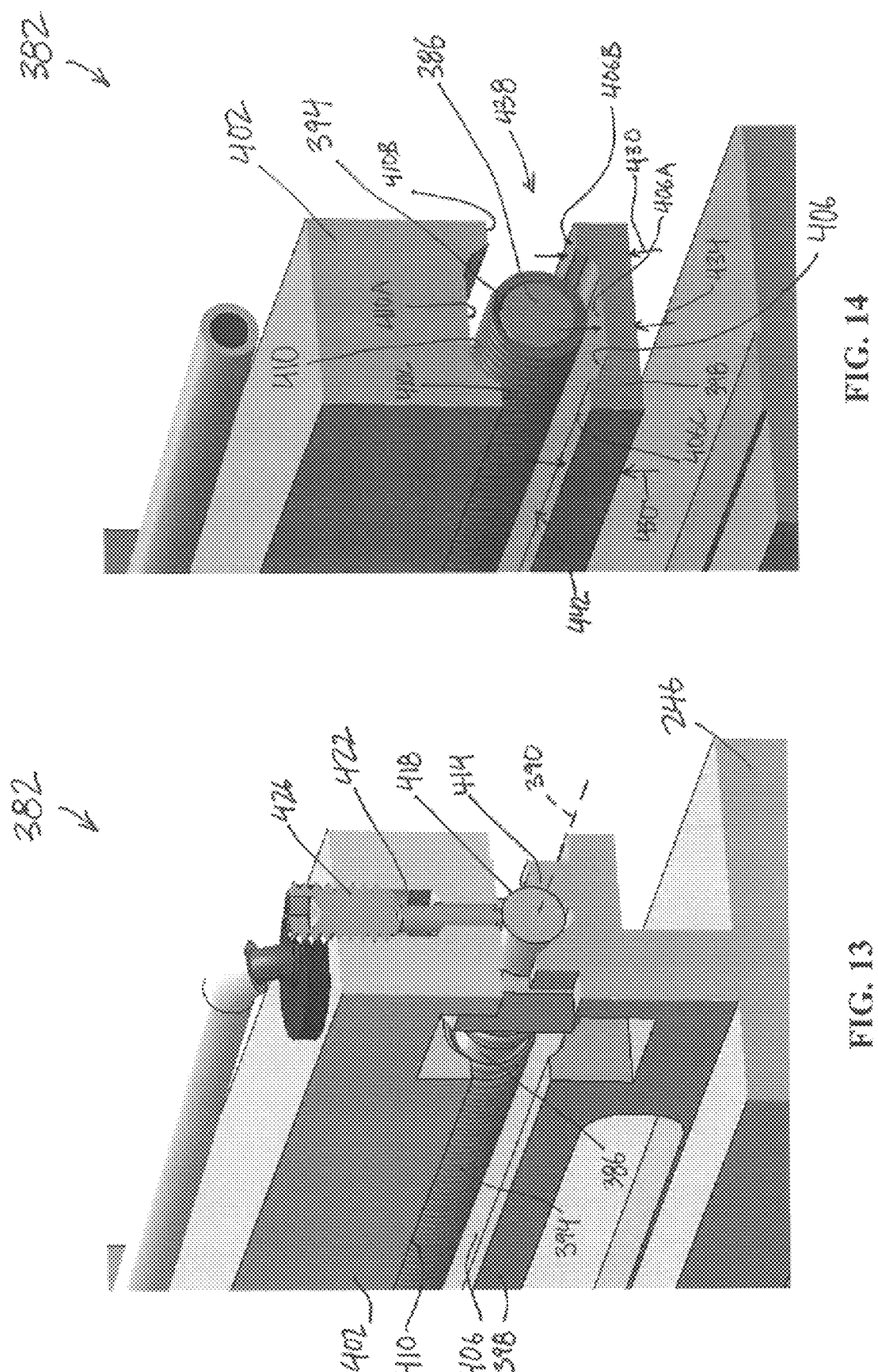
FIG. 13 is a partial sectional view of the heating assembly of FIG. 12, taken along lines 13-13.
FIG. 14 is another partial sectional view of the heating assembly of FIG. 12, taken along lines 14-14.

With reference to FIG. 13, the first reflector 398 includes a mount 414 configured to at least partially receive the core 386. In the illustrated embodiment, the mount 414 is a V-shaped groove that receives a cylindrical support 418 of the core 386. The second reflector 402 includes a bore 422 in which to receive a fastener 426, and the fastener 426 is configured to be adjusted within the bore 422 until the fastener 426 contacts the cylindrical support 418 on the core 386. In other words, the core 386 is retained within the mount 414 by the fastener 426. A similar second mount is likewise positioned at the opposite end of the core 386. In the illustrated embodiment, the mount 414 and the fastener 426 create stable 3-points of contact with the cylindrical support 418 and improves the overall alignment of the core 386. The core 386 is prone to warp, deflect, or twist when heated. The mount 414 improves overall alignment of the core 386 in assembly and operation. In other words, the mount 414 is self-aligning.

With reference to FIG. 14, the first surface 406 includes a first planar portion 406A, a first side portion 406B, and a second side portion 406C. The first planar portion 406A is positioned between the first side portion 406B and the second side portion 406C. The first side portion 406B and the second side portion 406C have a first thickness 430 and the first planar portion 406A has a second thickness 434. In the illustrated embodiment the first thickness 430 is larger than the second thickness 434. In other words, the side portions 406B, 406C wrap partially around the cylindrical core 386. Likewise, the second surface 410 includes a second planar portion 410A, a third side portion 410B, and a fourth side portion 410C. The second planar portion 410A is positioned between the third side portion 410B and the fourth side portion 410C.

With continued reference to FIG. 14, a first gap 438 is formed between the first side portion 406B and the third side portion 410B, and a second gap 442 is formed between the second side portion 406C and the fourth side portion 410C. In other words, the first side portion 406B is positioned opposite the third side portion 410B with the air gap 438 therebetween. Likewise, the second side portion 406C is positioned opposite the fourth side portion 410C with the air gap 442 therebetween. The core 386 is positioned between the first gap 438 and the second gap 442. In the illustrated embodiment, the first planar portion 406A is parallel to the second planar portion 410A, the first side portion 406B is parallel to the third side portion 410B, and the second side portion 406C is parallel to the fourth side portion 410C.

The first gap 438 is configured to receive a portion of the first tube T1 and a portion of the second tube T2 clamped in the first tube clamp 30. Likewise, the second gap 442 is configured to receive a portion of the first tube T1 and a portion of the second tube T2 clamped in the second tube clamp 30. In other words, portions of the tube coupled to the clamps 30, 34 are positioned adjacent the heater assembly 382 with portions of the tube received within the gaps 438, 442.

The first reflector 398 and the second reflector 402 are exposed to thermal energy of the core 396 and the winding 394, and the reflectors 398, 402 redirect the thermal energy to the side portions 406B, 406C, 410B, 410C to be utilized in heating the tubes T1, T2. In other words, the reflectors 398, 402 absorb radiant heat from the core 386 and conduct heat to the sides of the reflectors 398, 402 where the tubes T1, T2 are positioned. As such, the heater assembly 382 more efficiently heats the tube portions coupled to the clamps 30, 34. In other words, more thermal energy from the core 386 is being captured by the reflectors 398, 402 and utilized to heat the tube ends. As a result, less energy overall is used by the heating assembly 382.

Various features and advantages are set forth in the following claims.

What is claimed is:

1. A tube welder comprising:
a clamp block configured to receive a tube;
a screw coupled to the clamp block, wherein the clamp block translates along the screw in response to rotation of the screw;
a finger slidably coupled to the clamp block;
a spring biasing the finger to an extended position;
a carriage with a notch, the carriage coupled to the clamp block by a slide rail to permit relative movement between the carriage and the clamp block,
wherein when the finger is in the extended position, at least a portion of the finger is received within the notch and the clamp block is fixed for co-translation with respect to the carriage.

2. The tube welder of claim 1, wherein the clamp block is a first clamp block and the tube welder further includes a second clamp block coupled to the carriage, the second clamp block configured to receive the tube.

3. The tube welder of claim 2, wherein the tube welder includes a rail positioned between the first clamp block and the second clamp block.

4. The tube welder of claim 3, wherein the rail includes a first surface facing the first clamp block and a second surface facing the second clamp block; wherein the first surface is planar and the second surface is non-planar.

5. The tube welder of claim 4, wherein a distance between the second clamp block and a center axis of the rail varies as the second clamp block translates along the center axis.

6. The tube welder of claim 1, wherein the finger includes a post that is slidably received within a slot.

7. The tube welder of claim 6, wherein in response to the clamp block translating with respect to the screw, the post translates within the slot.

8. The tube welder of claim 7, wherein the slot translates the post against the spring bias such that the finger is in a retracted position, and wherein the clamp block is free to translate with respect to the carriage.

9. The tube welder of claim 1, wherein the carriage includes a groove configured to receive a portion of the clamp block.

10. The tube welder of claim 9, wherein the notch is formed within the groove on the carriage.

11. The tube welder of claim 6, wherein the slot includes a first portion, a second portion, a third portion, and a fourth portion, and wherein the second portion is positioned between the first portion and the third portion, and wherein the third portion is positioned between the second portion and the fourth portion.

12. The tube welder of claim 11, wherein the slot further includes a first ramp positioned between the first portion and the second portion.

13. The tube welder of claim 12, wherein the slot further includes a second ramp positioned between the second portion and the third portion.

14. The tube welder of claim 13, wherein the slot further includes a third ramp positioned between the third portion and the fourth portion.

15. The tube welder of claim 11, wherein the second portion is positioned further away from the carriage than the first portion and the third portion.

16. The tube welder of claim 15, wherein the fourth portion is positioned further away from the carriage than the first portion and the third portion.

17. The tube welder of claim 1, wherein the notch is a first notch and the carriage further includes a second notch, and wherein the portion of the finger is received in either the first notch or the second notch when in the extended position and the clamp block is thereby coupled for co-translation with the carriage.

18. The tube welder of claim 1, further including a detent configured to stop translation of the carriage until a threshold force is reached.

19. The tube welder of claim 18, wherein the detent includes a ball plunger coupled to the carriage and a rail along which the ball plunger slides.

20. The tube welder of claim 19, wherein the rail includes a protrusion against which the ball plunger abuts such that the detent stops translation of the carriage until the threshold force is reached.

* * * * *